US006936679B2

(12) United States Patent
Seki et al.

(10) Patent No.: US 6,936,679 B2
(45) Date of Patent: Aug. 30, 2005

(54) CHARGE-TRANSPORTING POLYMER

(75) Inventors: Mieko Seki, Minamiashigara (JP); Hirohito Yoneyama, Minamiashigara (JP); Daisuke Okuda, Minamiashigara (JP); Hidekazu Hirose, Minamiashigara (JP); Tadayoshi Ozaki, Minamiashigara (JP); Takeshi Agata, Minamiashigara (JP); Toru Ishii, Minamiashigara (JP); Kiyokazu Mashimo, Minamiashigara (JP); Katsuhiro Sato, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/237,750

(22) Filed: Sep. 10, 2002

(65) Prior Publication Data

US 2003/0207187 A1 Nov. 6, 2003

(30) Foreign Application Priority Data

Mar. 14, 2002 (JP) ....................................... 2002-069530

(51) Int. Cl.[7] .......................... C08G 8/02; C08G 63/00; G03G 15/02

(52) U.S. Cl. ....................... 528/125; 528/220; 528/272; 528/125; 430/58.7; 430/59; 430/96; 525/539

(58) Field of Search ................................ 528/125, 220, 528/272; 525/539, 439; 430/58.7, 59, 96

(56) References Cited

U.S. PATENT DOCUMENTS

| | | | | | |
|---|---|---|---|---|---|
| 5,604,064 | A | * | 2/1997 | Nukada et al. | 430/58.65 |
| 5,731,118 | A | * | 3/1998 | Nukada et al. | 430/58.7 |
| 5,770,339 | A | * | 6/1998 | Nukada et al. | 430/58.7 |
| 5,817,739 | A | * | 10/1998 | Nukada et al. | 528/292 |

FOREIGN PATENT DOCUMENTS

| | | | |
|---|---|---|---|
| JP | A 61-20953 | | 1/1986 |
| JP | A 1-134456 | | 5/1989 |
| JP | A 1-134457 | | 5/1989 |
| JP | A 1-134462 | | 5/1989 |
| JP | A 4-133065 | | 5/1992 |
| JP | A 4-133066 | | 5/1992 |
| JP | A 5-80550 | | 4/1993 |
| JP | 9059389 | * | 3/1997 |
| JP | 9067561 | * | 3/1997 |
| JP | 9176301 | * | 7/1997 |

OTHER PUBLICATIONS

Notice for Reason of Rejection.

* cited by examiner

*Primary Examiner*—P. Hampton Hightower
(74) *Attorney, Agent, or Firm*—Fildes & Outland, P.C.

(57) ABSTRACT

A charge-transporting polymer is represented by the following general formula (I-1) or (I-2):

(I-1)

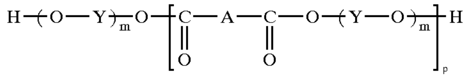

(I-2)

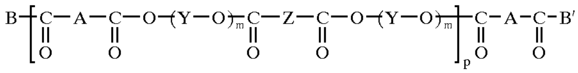

wherein A represents a group represented by the following general formula (II-1):

(II-1)

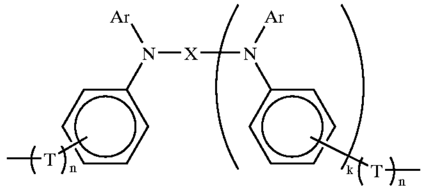

15 Claims, 16 Drawing Sheets

AMINE COMPOUND OF SYNTHESIS EXAMPLE 1

AMINE COMPOUND OF SYNTHESIS EXAMPLE 4

AMINE COMPOUND OF SYNTHESIS EXAMPLE 5

AMINE COMPOUND OF SYNTHESIS EXAMPLE 6

AMINE COMPOUND OF SYNTHESIS EXAMPLE 7

AMINE COMPOUND OF SYNTHESIS EXAMPLE 8

CHARGE-TRANSPORTING POLYMER (17) OF EXAMPLE 1

CHARGE-TRANSPORTING POLYMER (32) OF EXAMPLE 2

CHARGE-TRANSPORTING POLYMER (36) OF EXAMPLE 3

CHARGE-TRANSPORTING POLYMER (24) OF EXAMPLE 4

CHARGE-TRANSPORTING POLYMER (80) OF EXAMPLE 6

CHARGE-TRANSPORTING POLYMER (84) OF EXAMPLE 7

CHARGE-TRANSPORTING POLYMER (88) OF EXAMPLE 9

CHARGE-TRANSPORTING POLYMER

BACKGROUND OF THE INVENTION

1. Field of the Invention

The present invention relates to a new charge-transporting polymer useful for various organic electronic devices such as an electrophotographic photoconductor, a photoelectric transducer, and an organic transistor.

2. Description of the Related Art

A charge-transporting polymer, a typical example of which is polyvinylcarbazole (PVK), is useful for a photoconductive material of an electrophotographic photoconductor, a photoelectric transducer, an organic transistor material and the like. This is made into a layer and the layer is used as a charge-transporting material. As the charge-transporting material, charge-transporting polymers, a typical example of which is PVK, and low molecular weight compound dispersed systems, in which a charge-transporting low molecular weight compound is dispersed in a polymer, are well known. The low molecular weight dispersed systems are mainly used, particularly for electrophotographic photoconductors since the systems are variable in raw material thereof and can easily give high function. In recent years, electrophotographic photoconductors have been used in high-speed copiers or printers as the performance of organic photoconductors has been becoming higher. However, the performance is not insufficient at present, and the lifespan thereof is earnestly required to be longer. About the charge-transporting layer of the low molecular weight systems, which are mainstream at present, the electric properties thereof are being sufficiently satisfied. However, the charge-transporting layer has a problem that the layer is essentially poor in mechanical strength and is weak against abrasion since a low molecular weight compound is dispersed in a polymer.

On the other hand, charge-transporting polymers are actively researched at present since the polymers have possibility that the above-mentioned drawbacks are sufficiently overcome. For example, U.S. Pat. No. 4,806,443 discloses a polycarbonate obtained by polymerizing a specific dihydroxyarylamine and bischloroformate, and U.S. Pat. No. 4,806,444 discloses a polycarbonate obtained by polymerizing a specific dihydroxyarylamine and phosgene. Moreover, U.S. Pat. No. 4,801,517 discloses a polycarbonate obtained by polymerizing bishydroxyalkylarylamine, and bischloroformate or phosgene, and U.S. Pat. No. 4,937,165 and No. 4,959,228 disclose a polycarbonate obtained by polymerizing a specific dihydroxyarylamine or bishydroxyalkylarylamine, bishydroxyalkylamine, and bischloroformate, or a polyester obtained by polymerizing the amine and bisacylhalide. Furthermore, U.S. Pat. No. 5,034,296 discloses a polyester, or a polycarbonate of an arylamine having a specific fluorene skeleton, and U.S. Pat. No. 4,983,482 discloses a polyurethane. Additionally, Japanese Patent Application Publication (JP-B) No. 59-28903 discloses a polyester having, as a main chain, a specific bisstyrylbisarylamine. Japanese Patent Application Laid-Open (JP-A) Nos. 61-20953, 1-134456, 1-134457, 1-134462, 4-133065 and 4-133066 suggest polymers and photoconductors having, as a pendant, a charge-transporting substituent such as hydrazone and triarylamine.

Various properties such as solubility, film-formability, mobility, heat resistance, and matching of oxidation potential are required for a charge-transporting polymer. In order to satisfy these requirements, it is general to introduce a substituent to the polymer so as to control the physical properties thereof. Since the physical properties of the charge-transporting polymer have a correlation with physical properties of a charge-transporting monomer, which is the starting material of the polymer, the molecular design of the charge-transporting monomer becomes important.

The monomer which is the starting material of the above-mentioned triarylamine polymer can be roughly classified into two kinds, that is, (1) dihydroxyarylamine, and (2) bishydroxyalkylarylamine. However, dihydroxyarylamine has an aminophenolic structure to be easily oxidized and is not easily purified. Particularly in the case in which dihydroxyarylamine has the hydroxy group at para position, the dihydroxyarylamine becomes more unstable. Additionally, dihydroxyarylamine has a structure in which oxygen of the substituent bonds directly to the aromatic ring; therefore, charge distribution is easily unbalanced by the electron-withdrawing property of the oxygen. As a result, a problem that the mobility thereof falls easily arises.

On the other hand, bishydroxyalkylarylamine is not affected strongly by the electron-withdrawing property of oxygen because of the methylene group, but is not easily synthesized. That is, according to a reaction of diarylamine or diarylbenzidine with 3-bromoiodobenzene, a mixture tends to be produced since both of bromine and iodine have reactivity. Thus, the yield of the target amine falls. There also arises the following problem: alkyllithium, which is used when lithium is bonded to a bromine, or ethylene oxide is highly dangerous and toxic and it is therefore necessary to take notice of the handling thereof.

Accordingly, it is desirable to develop a charge-transporting material which is easily synthesized and has a high charge transportability and a superior endurance in order to develop an organic electronic device such as an electrophotographic photoconductor which is more superior in light response speed and mechanical endurance or a high-performance organic transistor.

SUMMARY OF THE INVENTION

The present invention can overcome the above-mentioned problems in the prior art. An object thereof is to provide a new charge-transporting polymer which has a good charge transportability, is superior insolubility and film-formability, is easily synthesized and has a high thermal stability (high glass transition temperature).

In light of the above-mentioned problems, the inventors made eager investigations on various polymers. As a result, the inventors have found that a new charge-transporting polymer represented by the following general formula (I-1) or (I-2) is superior in charge transportability and heat resistance and can easily be synthesized; therefore, the polymer is effective for organic electronic devices such as an electrophotographic photoconductor and an organic transistor. As a result, the invention has been made.

One aspect of the invention provides a charge-transporting polymer represented by the following general formula (I-1) or (I-2):

(I-1)

$$H\!\left(O-Y\right)_m O\left[\underset{\displaystyle O}{\overset{}{\underset{\|}{C}}}-A-\underset{\displaystyle O}{\underset{\|}{C}}-O\left(Y-O\right)_m\right]_p H$$

-continued (I-2)

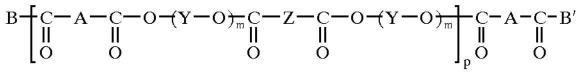

wherein each of Y and Z independently represents a bivalent hydrocarbon group; A represents a group represented by the following general formula (II-1), each of B and B' independently represents the group —O—(Y—O)$_m$—H or the group —O—(Y—O)$_m$—CO-Z-CO—OR' wherein R' represents a hydrogen atom, an alkyl group, a substituted or unsubstituted aryl group, or a substituted or unsubstituted aralkyl group, and each of Y and Z independently represents a bivalent hydrocarbon group, and m is an integer of 1 to 5, m is an integer of 1 to 5, and p is an integer of 5 to 5,000:

(II-1)

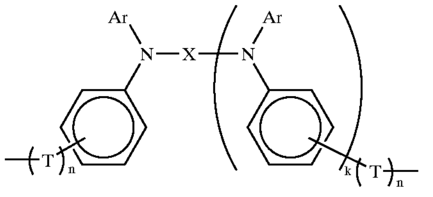

wherein Ar represents a substituted or unsubstituted monovalent polynuclear aromatic ring having 2 to 10 aromatic rings or a substituted or unsubstituted monovalent condensed aromatic ring having 2 to 10 aromatic rings, X represents a substituted or unsubstituted bivalent aromatic group, T represents a bivalent linear hydrocarbon group having 1 to 6 carbon atoms or a bivalent branched hydrocarbon group having 2 to 10 carbon atoms, and each of k and n is an integer of 0 or 1.

DETAIL DESCRIPTION OF THE PREFERRED EMBODIMENTS

Figure 1:
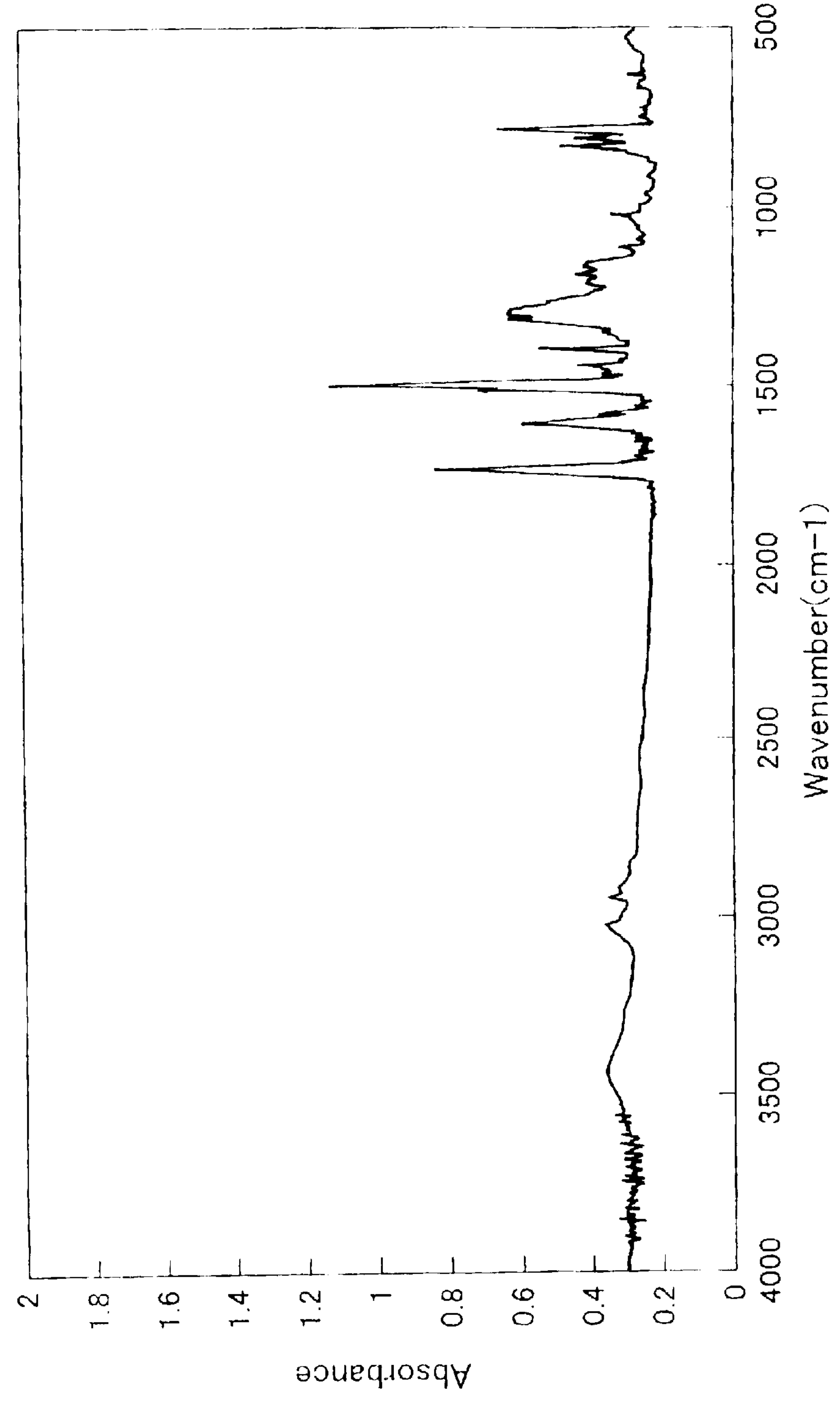
FIG. 1 is a graph showing an IR spectrum of an amine compound of Synthesis Example 1.

The present invention will be described in detail hereinafter.

The charge-transporting polymer of the invention is represented by the following general formula (I-1) or (I-2). The charge-transporting polymer of the invention can have either of hole transportability or electron transportability by selecting an appropriate structure from structures which will be described later.

(I-1)

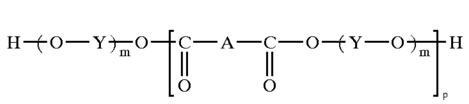

(I-2)

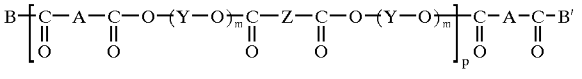

wherein each of Y and Z independently represents a bivalent hydrocarbon group; A represents a group represented by the following general formula (II-1), each of B and B' independently represents the group —O—(Y—O)$_m$—H or the group —O—(Y—O)$_m$—CO-Z-CO—OR' (wherein R' represents a hydrogen atom, an alkyl group, a substituted or unsubstituted aryl group, or a substituted or unsubstituted aralkyl group, and each of Y and Z independently represents a bivalent hydrocarbon group, and m is an integer of 1 to 5), m is an integer of 1 to 5, and p is an integer of 5 to 5,000:

(II-1)

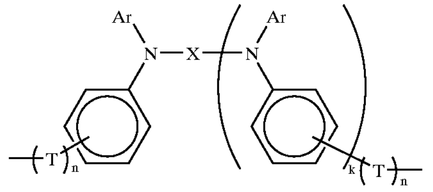

wherein Ar represents a substituted or unsubstituted monovalent polynuclear aromatic ring having 2 to 10 aromatic rings, or a substituted or unsubstituted monovalent condensed aromatic ring having 2 to 10 aromatic rings, X represents a substituted or unsubstituted bivalent aromatic group, T represents a bivalent linear hydrocarbon group having 1 to 6 carbon atoms or a bivalent branched hydrocarbon group having 2 to 10 carbon atoms, and each of k and n is an integer of 0 or 1.

Specific and preferable examples of X, Y, Z, Ar and T in the general formulae (I-1), (I-2) and (II-1) are as follows.

Preferable examples of X include groups selected from the following groups (IV-1) to (IV-2):

(IV-1)

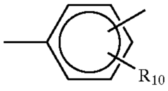

(IV-2)

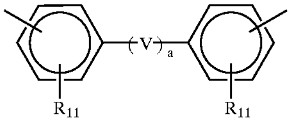

wherein each of $R_{10}$ and $R_{11}$ independently represents a hydrogen atom, an alkyl group having 1 to 4 carbon atoms, an alkoxy group having 1 to 4 carbon atoms, a substituted or unsubstituted phenyl group, a substituted or unsubstituted aralkyl group, or a halogen atom, a is 0 or 1, and V represents a group selected from the following groups (V-1) to (V-10):

$$-(CH_2)_b- \quad (V\text{-}1)$$

$$-C(CH_3)_2- \quad (V\text{-}2)$$

$$-O- \quad (V\text{-}3)$$

$$-S- \quad (V\text{-}4)$$

(V-5)

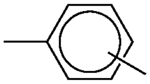

(V-6)

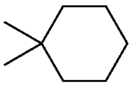

$$-C(CF_3)_2- \quad (V\text{-}7)$$

$$-Si(CH_3)_2- \quad (V\text{-}8)$$

$$-CH{=}CH- \quad (V\text{-}9)$$

(V-10)

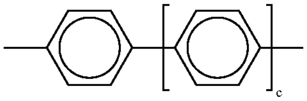

wherein b is an integer of 1 to 10 and c is an integer of 1 to 3.

Preferably, each of Y and Z independently represents a group selected from the following groups (VI-1) to (VI-7):

$$-(CH_2)_d- \quad (VI\text{-}1)$$

$$-(CH_2CH_2O)_e-(CH_2CH_2)- \quad (VI\text{-}2)$$

(VI-3)

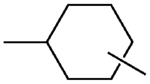

(VI-4)

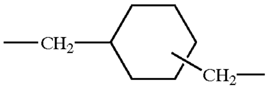

(VI-5)

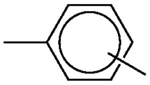

(VI-6)

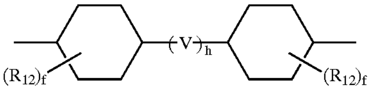

(VI-7)

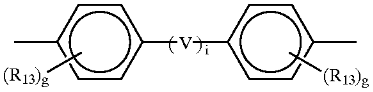

wherein each of $R_{12}$ and $R_{13}$ independently represents a hydrogen atom, an alkyl group having 1 to 4 carbon atoms, an alkoxy group having 1 to 4 carbon atoms, a substituted or unsubstituted phenyl group, a substituted or unsubstituted aralkyl group, or a halogen atom, each of d and e independently represents an integer of 1 to 10, each of f and g independently represents an integer of 0, 1 or 2, and each of h and i independently represents 0 or 1, and V has the same meanings as V in the groups (IV-1) to (IV-2).

Ar represents a substituted or unsubstituted monovalent polynuclear aromatic ring having 2 to 10 aromatic rings, or a substituted or unsubstituted a monovalent condensed aromatic ring having 2 to 10 aromatic rings. Specific and preferable examples of Ar include a substituted or unsubstituted biphenyl group, a substituted or unsubstituted terphenyl group, a substituted or unsubstituted naphthyl group, a substituted or unsubstituted fluorenyl group, a substituted or unsubstituted phenanthrenyl group, and a substituted or unsubstituted pyrenyl group.

Examples of the substituent of the polynuclear aromatic ring or the condensed aromatic ring include a hydrogen atom, an alkyl group, an alkoxy group, an aryl group, an aralkyl group, a substituted amino group and a halogen atom. The alky group preferably has 1 to 10 carbon atoms. Examples thereof include methyl, ethyl, propyl, and isopropyl groups. The alkoxy group preferably has 1 to 10 carbon atoms. Examples thereof include methoxy, ethoxy, propoxy and isopropoxy groups. The aryl group preferably has 6 to 20 carbon atoms. Examples thereof include phenyl, and tolyl groups. The aralkyl group preferably has 7 to 20 carbon atoms. Examples thereof include benzyl, and phenethyl group. Examples of the substituent of the substituted amino group include alkyl, aryl and aralkyl groups. Specific examples thereof are the same as described above.

T represents a bivalent linear hydrocarbon group having 1 to 6 carbon atoms, or a bivalent branched hydrocarbon group having 2 to 10 carbon atoms, and is preferably selected from a bivalent linear hydrocarbon group having 2 to 6 carbon atoms, and a bivalent branched hydrocarbon group having 3 to 7 carbon atoms. Specific examples of the structure of T are as follows:

$—CH{=}CH—$  $—CH{=}CH—CH{=}CH—$ $—CH_2—CH{=}C{=}CH—$  $—CH_2—$  $—(CH_2)_2—$ $—(CH_2)_3—$  $—(CH_2)_4—$  $—(CH_2)_5—$  $—(CH_2)_6—$

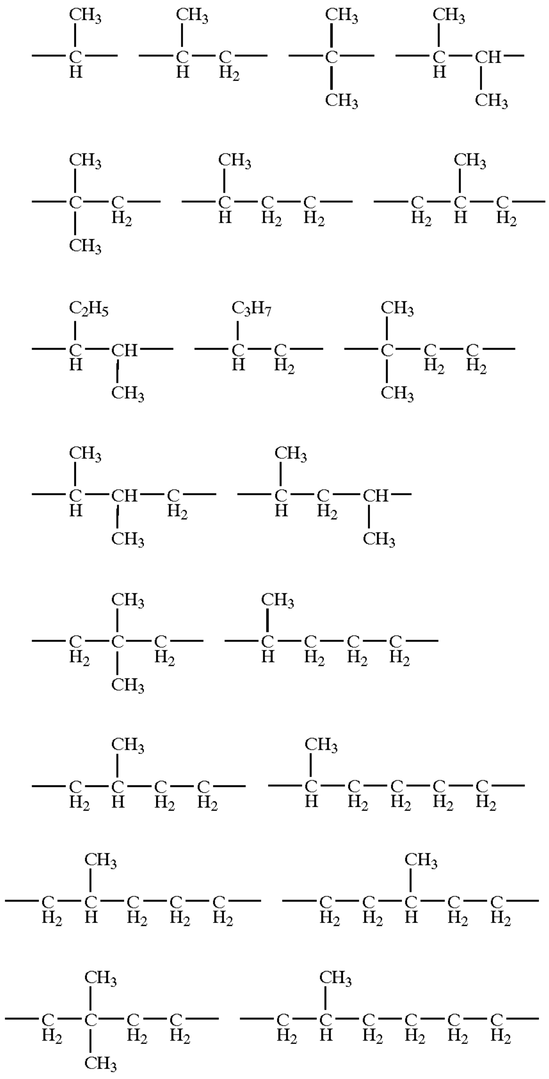

-continued

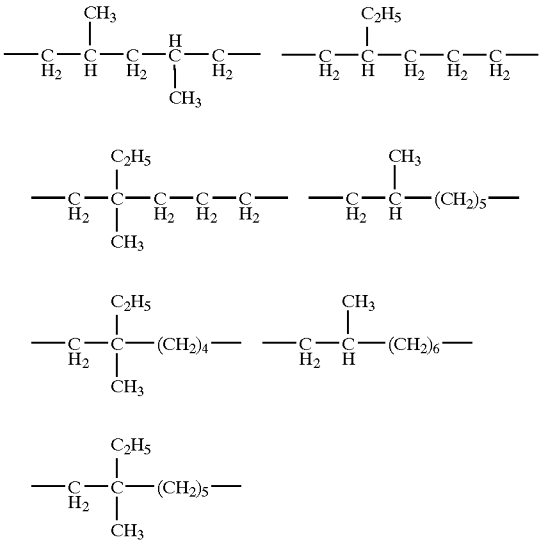

In the charge-transporting polymer of the invention, it is particularly preferable that X in the general formula (II -2) represents a group represented by the following structural formula (III-1), (III-2) or (III-3). A polymer having such a biphenyl structure or a terphenyl structure is particularly preferable since the polymer has a high mobility and is highly practical.

(III-1)

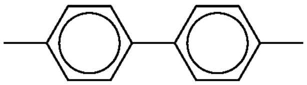

(III-2)

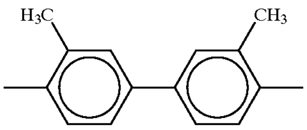

(III-3)

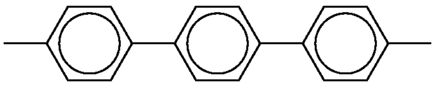

The polymerization degree (p) of the charge-transporting polymer of the invention is from 5 to 5,000, and is preferably from 10 to 1,000 in view of film-formability, the stability of the resultant element, and the like. The weight average molecular weight Mw thereof is preferably from 10,000 to 300,000.

Specific examples of the compound having the structure represented by the general formula (I-1) as the charge-transporting polymer of the invention are shown below. However, the compound is not limited to these examples. Examples in which "-" is shown in the column of Z are specific examples of the charge-transporting polymer represented by the general formula (I-1), and the others are specific examples of the charge-transporting polymer represented by the general formula (I-2). Hereinafter, a specific example to which the number of a compound is attached (for example, a specific example to which No. 15 is attached) is referred to as a charge-transporting polymer (15).

TABLE 1
| Compound | A | | | | | | Y | Z | m | p |
|---|---|---|---|---|---|---|---|---|---|---|
| | X | Ar | T | Bonding position | k | n | | | | |
| 1 | 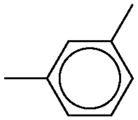 | 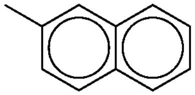 | $—CH_2CH_2—$ | 3 | 0 | 1 | $—CH_2CH_2—$ | — | 1 | 101 |
| 2 | 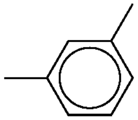 | 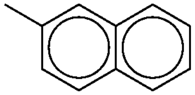 | 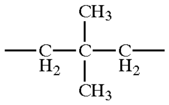 | 3 | 0 | 1 | $—CH_2CH_2—$ | — | 1 | 88 |
| 3 | 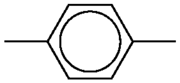 | 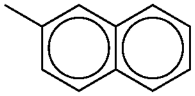 | $—CH_2CH_2—$ | 3 | 0 | 1 | $—CH_2CH_2—$ | — | 1 | 135 |
| 4 | 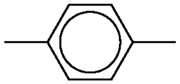 | 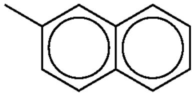 | 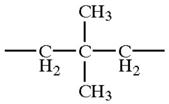 | 4 | 0 | 1 | $—CH_2CH_2—$ | 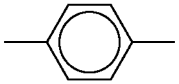 | 1 | 98 |
| 5 | 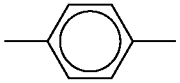 | 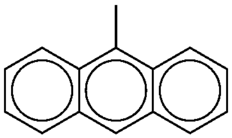 | $—CH_2CH_2—$ | 4 | 0 | 1 | $—CH_2CH_2—$ | 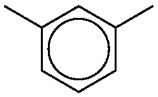 | 2 | 110 |

TABLE 1-continued
| | A | | | | | | | | | |
|---|---|---|---|---|---|---|---|---|---|---|
| Compound | X | Ar | T | Bonding position | k | n | Y | Z | m | p |
| 6 | 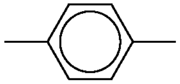 | 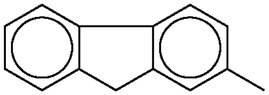 | —$CH_2CH_2$— | 4 | 0 | 1 | 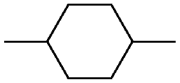 | — | 1 | 65 |
| 7 | 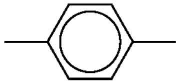 | 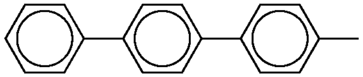 | —$CH_2$— | 4 | 0 | 1 | 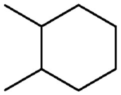 | —$(CH_2)_4$— | 1 | 92 |
| 8 | 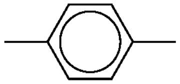 | 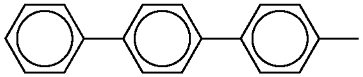 | —$CH_2CH_2$— | 4 | 0 | 1 | 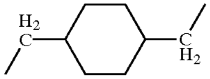 | — | 1 | 103 |
| 9 | 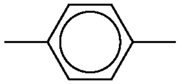 | 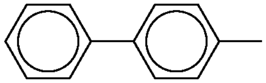 | —$CH_2$— | 4 | 0 | 1 | —$CH_2CH_2$— | — | 1 | 84 |
| 10 | 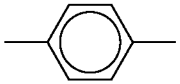 | 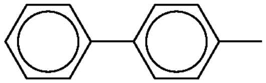 | —$CH_2CH_2$— | 4 | 0 | 1 | —$CH_2CH_2$— | — | 1 | 77 |

TABLE 2
| Compound | A: X | A: Ar | A: T | A: Bonding position | A: k | A: n | Y | Z | m | p |
|---|---|---|---|---|---|---|---|---|---|---|
| 11 | 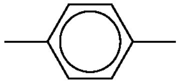 | 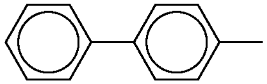 | $-(CH_2)_4-$ | 4 | 0 | 1 | $-CH_2CH_2-$ | — | 1 | 108 |
| 12 | 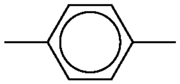 | 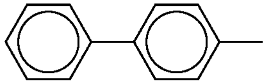 | — | 4 | 0 | 0 | $-CH_2CH_2-$ | — | 1 | 99 |
| 13 | 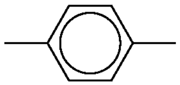 | 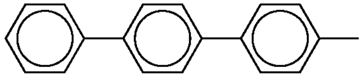 | — | 4 | 0 | 0 | 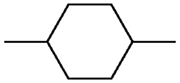 | — | 1 | 85 |
| 14 | 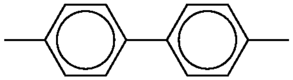 | 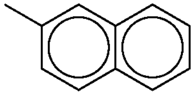 | $-CH_2CH_2-$ | 2 | 1 | 1 | 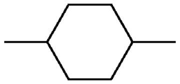 | — | 1 | 86 |
| 15 | 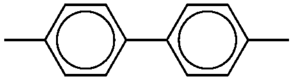 | 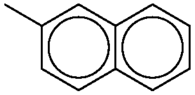 | $-CH_2CH_2-$ | 3 | 1 | 1 | 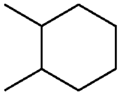 | — | 1 | 73 |
| 16 | 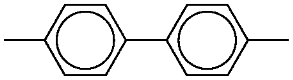 | 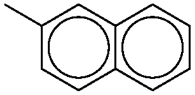 | $-CH_2-$ | 4 | 1 | 1 | 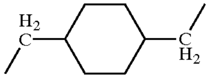 | 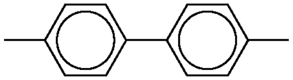 | 1 | 64 |

TABLE 2-continued
| Compound | A: X | A: Ar | A: T | A: Bonding position | A: k | A: n | Y | Z | m | p |
|---|---|---|---|---|---|---|---|---|---|---|
| 17 | 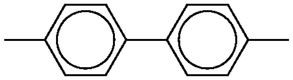 | 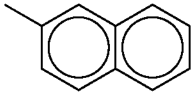 | $—CH_2CH_2—$ | 4 | 1 | 1 | $—CH_2CH_2—$ | — | 1 | 47 |
| 18 | 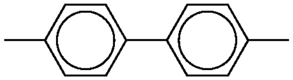 | 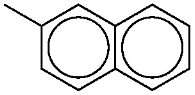 | $—(CH_2)_4—$ | 4 | 1 | 1 | $—CH_2CH_2—$ | 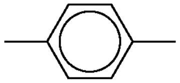 | 1 | 102 |
| 19 | 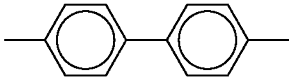 | 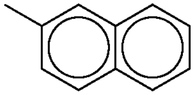 | 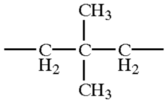 | 4 | 1 | 1 | 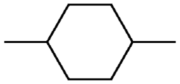 | — | 1 | 97 |
| 20 | 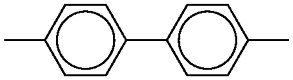 | 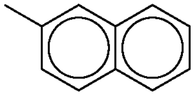 | — | 4 | 1 | 0 | $—CH_2CH_2—$ | — | 1 | 101 |

TABLE 3
| | A | | | | | | | | | |
|---|---|---|---|---|---|---|---|---|---|---|
| Compound | X | Ar | T | Bonding position | k | n | Y | Z | m | p |
| 21 | 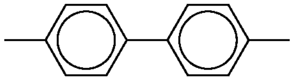 | 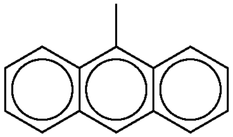 | $—CH_2CH_2—$ | 4 | 1 | 1 | 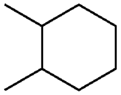 | 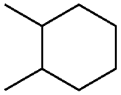 | 1 | 100 |
| 22 | 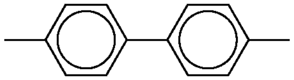 | 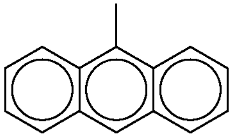 | $—CH_2CH_2—$ | 4 | 1 | 1 | 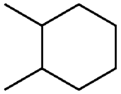 | — | 1 | 98 |
| 23 | 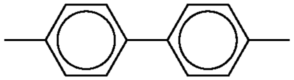 | 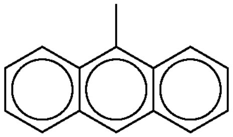 | — | 4 | 1 | 0 | $—CH_2CH_2—$ | — | 1 | 106 |
| 24 | 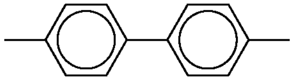 | 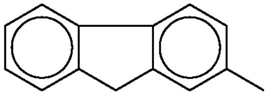 | $—CH_2CH_2—$ | 4 | 1 | 1 | $—CH_2CH_2—$ | — | 1 | 56 |
| 25 | 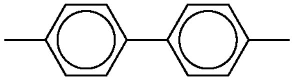 | 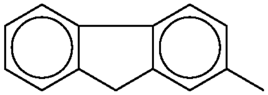 | — | 4 | 1 | 0 | $—CH_2CH_2—$ | — | 1 | 125 |

TABLE 3-continued
| | A | | | | | | | | | | |
|---|---|---|---|---|---|---|---|---|---|---|---|
| Compound | X | Ar | T | Bonding position | k | n | Y | Z | m | p |
| 26 | 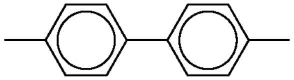 | 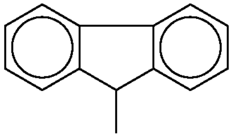 | $—CH_2CH_2—$ | 4 | 1 | 1 | $—CH_2CH_2—$ | — | 1 | 100 |
| 27 | 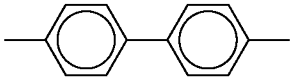 | 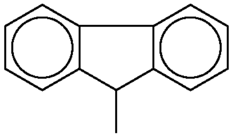 | $—CH_2CH_2—$ | 4 | 1 | 1 | $—CH_2CH_2—$ | $—(CH_2)_4—$ | 1 | 95 |
| 28 | 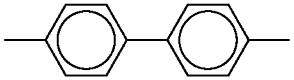 | 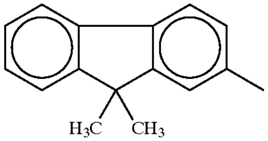 | $—CH_2CH_2—$ | 4 | 1 | 1 | 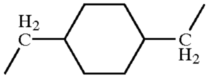 | 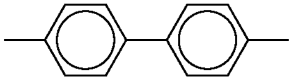 | 1 | 84 |
| 29 | 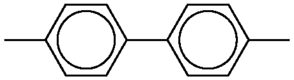 | 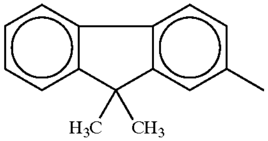 | $—CH_2CH_2—$ | 4 | 1 | 1 | $—CH_2CH_2—$ | — | 1 | 56 |

TABLE 4
| | A | | | | | | | | | | |
|---|---|---|---|---|---|---|---|---|---|---|---|
| Compound | X | Ar | T | Bonding position | k | n | Y | Z | m | p |
| 30 | 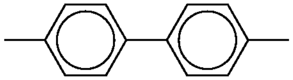 | 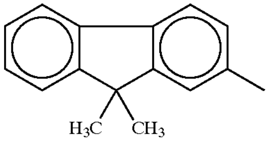 | — | 4 | 1 | 0 | $—CH_2CH_2—$ | — | 1 | 70 |
| 31 | 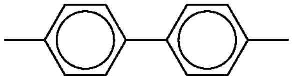 | 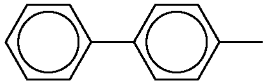 | $—CH_2CH_2—$ | 3 | 1 | 1 | $—CH_2CH_2—$ | 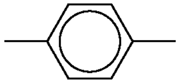 | 1 | 82 |
| 32 | 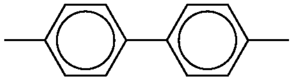 | 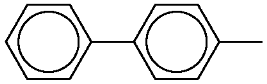 | $—CH_2CH_2—$ | 4 | 1 | 1 | $—CH_2CH_2—$ | — | 1 | 38 |
| 33 | 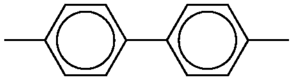 | 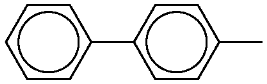 | 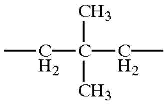 | 4 | 1 | 1 | $—CH_2CH_2—$ | 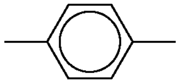 | 1 | 105 |
| 34 | 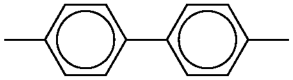 | 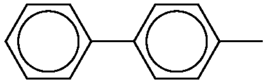 | $—CH_2CH_2—$ | 3 | 1 | 1 | 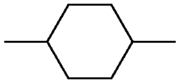 | — | 1 | 123 |

TABLE 4-continued
| Com-pound | A: X | A: Ar | A: T | A: Bonding position | A: k | A: n | Y | Z | m | p |
|---|---|---|---|---|---|---|---|---|---|---|
| 35 | 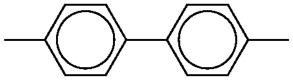 | 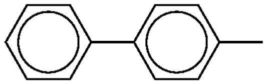 | — | 4 | 1 | 0 | $—CH_2CH_2—$ | — | 1 | 99 |
| 36 | 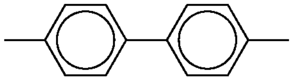 | 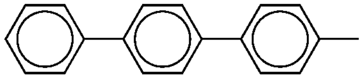 | $—CH_2CH_2—$ | 4 | 1 | 1 | $—CH_2CH_2—$ | — | 1 | 28 |
| 37 | 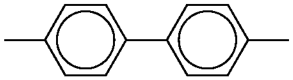 | 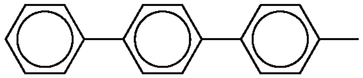 | $—CH_2CH_2—$ | 4 | 1 | 1 | 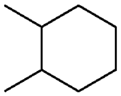 | — | 1 | 95 |
| 38 | 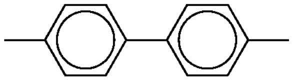 | 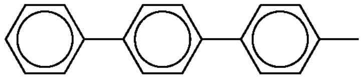 | $—(CH_2)_3—$ | 4 | 1 | 1 | 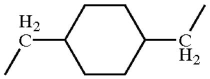 | 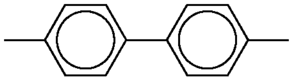 | 1 | 88 |
| 39 | 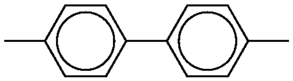 | 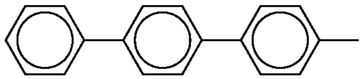 | — | 4 | 1 | 0 | $—CH_2CH_2—$ | — | 1 | 100 |

TABLE 5
| Compound | A | | | | | | Y | Z | m | p |
|---|---|---|---|---|---|---|---|---|---|---|
| | X | Ar | T | Bonding position | k | n | | | | |
| 40 | 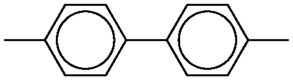 | 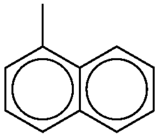 | $—(CH_2)_3—$ | 4 | 1 | 1 | $—CH_2CH_2—$ | — | 1 | 57 |
| 41 | 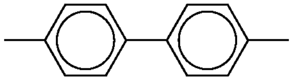 | 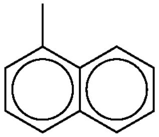 | 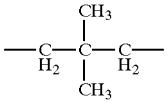 | 4 | 1 | 1 | $—CH_2CH_2—$ | — | 1 | 108 |
| 42 | 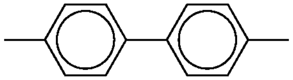 | 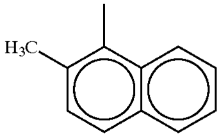 | $—CH_2CH_2—$ | 4 | 1 | 1 | $—CH_2CH_2—$ | — | 1 | 67 |
| 43 | 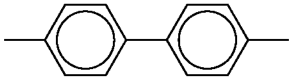 | 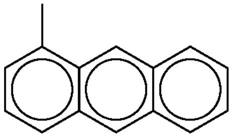 | $—CH_2CH_2—$ | 4 | 1 | 1 | $—CH_2CH_2—$ | — | 1 | 140 |
| 44 | 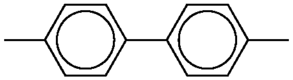 | 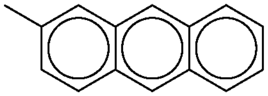 | $—CH_2CH_2—$ | 4 | 1 | 1 | $—CH_2CH_2—$ | — | 1 | 123 |

TABLE 5-continued
| Compound | A: X | A: Ar | A: T | A: Bonding position | A: k | A: n | Y | Z | m | p |
|---|---|---|---|---|---|---|---|---|---|---|
| 45 | 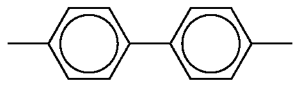 | 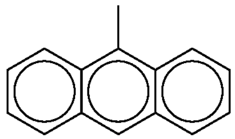 | $—CH_2CH_2—$ | 4 | 1 | 1 | $—CH_2CH_2—$ | — | 1 | 123 |
| 46 | 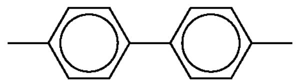 | 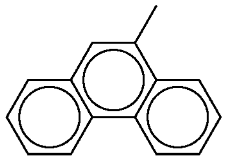 | $—CH_2CH_2—$ | 4 | 1 | 1 | $—CH_2CH_2—$ | — | 1 | 105 |
| 47 | 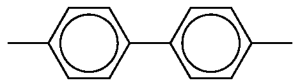 | 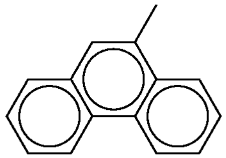 | $—CH_2—$ | 3 | 1 | 1 | $—CH_2CH_2—$ | — | 1 | 105 |

TABLE 6
| | A | | | | | | | | | |
|---|---|---|---|---|---|---|---|---|---|---|
| Compound | X | Ar | T | Bonding position | k | n | Y | Z | m | p |
| 48 | 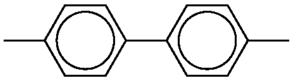 | 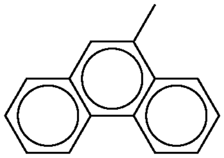 | $—CH_2CH_2—$ | 3 | 1 | 1 | $—CH_2CH_2—$ | — | 1 | 84 |
| 49 | 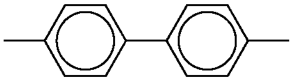 | 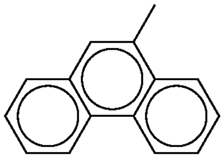 | — | 4 | 1 | 0 | $—CH_2CH_2—$ | — | 1 | 95 |
| 50 | 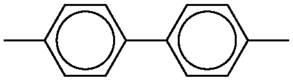 | 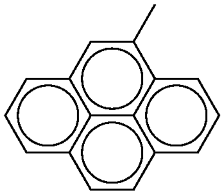 | $—CH_2—$ | 4 | 1 | 1 | $—CH_2CH_2—$ | — | 1 | 100 |
| 51 | 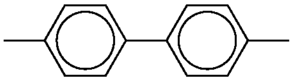 | 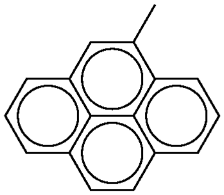 | $—CH_2CH_2—$ | 4 | 1 | 1 | $—CH_2CH_2—$ | — | 1 | 95 |
| 52 | 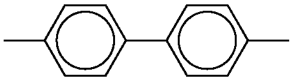 | 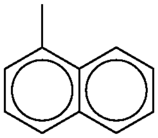 | $—CH_2—$ | 4 | 1 | 1 | $—CH_2CH_2—$ | — | 1 | 84 |
| 53 | 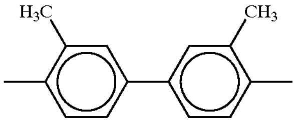 | 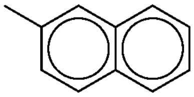 | $—CH_2CH_2—$ | 4 | 1 | 1 | $—CH_2CH_2—$ | — | 1 | 88 |
| 54 | 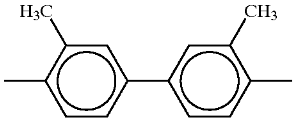 | 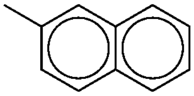 | $—CH_2CH_2—$ | 4 | 1 | 1 | 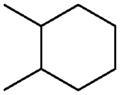 | — | 1 | 96 |

TABLE 7
| Com-pound | A: X | A: Ar | A: T | A: Bonding position | A: k | A: n | Y | Z | m | p |
|---|---|---|---|---|---|---|---|---|---|---|
| 55 | 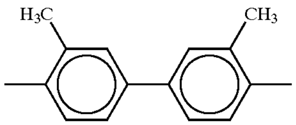 | 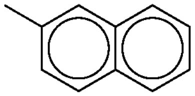 | $-(CH_2)_4-$ | 4 | 1 | 1 | $-CH_2CH_2-$ | — | 1 | 100 |
| 56 | 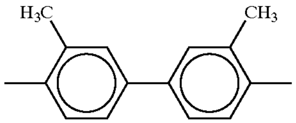 | 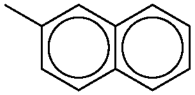 | 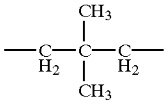 | 4 | 1 | 1 | $-CH_2CH_2-$ | 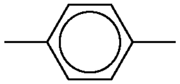 | 1 | 85 |
| 57 | 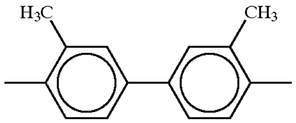 | 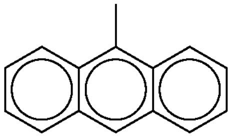 | $-CH_2CH_2-$ | 4 | 1 | 1 | 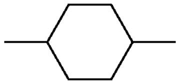 | — | 1 | 75 |
| 58 | 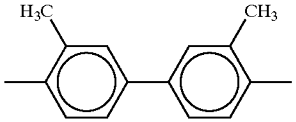 | 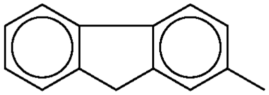 | $-CH_2CH_2-$ | 4 | 1 | 1 | $-CH_2CH_2-$ | — | 1 | 85 |
| 59 | 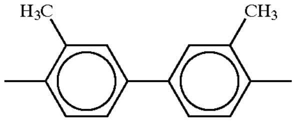 | 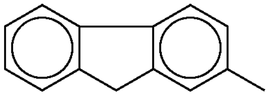 | $-CH_2CH_2-$ | 4 | 1 | 1 | 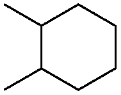 | — | 1 | 100 |

TABLE 7-continued
| Compound | A: X | A: Ar | A: T | A: Bonding position | A: k | A: n | Y | Z | m | p |
|---|---|---|---|---|---|---|---|---|---|---|
| 60 | 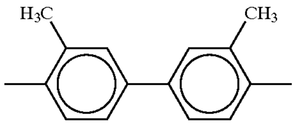 | 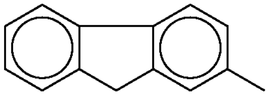 | $—CH_2—$ | 4 | 1 | 1 | 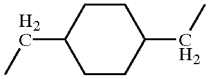 | 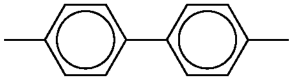 | 1 | 113 |
| 61 | 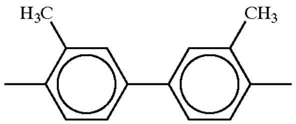 | 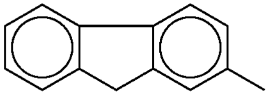 | $—CH_2CH_2—$ | 4 | 1 | 1 | $—CH_2CH_2—$ | — | 1 | 113 |
| 62 | 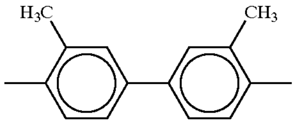 | 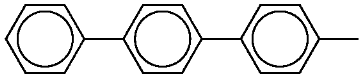 | $—CH_2CH_2—$ | 3 | 1 | 1 | $—CH_2CH_2—$ | — | 1 | 127 |

TABLE 8
| Compound | A: X | A: Ar | A: T | A: Bonding position | A: k | A: n | Y | Z | m | p |
| --- | --- | --- | --- | --- | --- | --- | --- | --- | --- | --- |
| 63 | 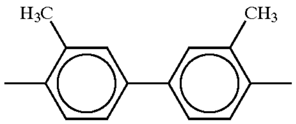 | 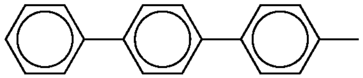 | $—CH_2CH_2—$ | 4 | 1 | 1 | $—CH_2CH_2—$ | 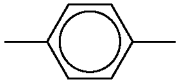 | 1 | 115 |
| 64 | 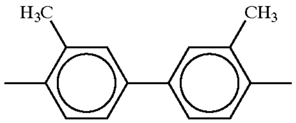 | 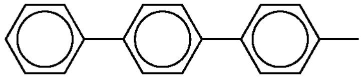 | $—CH_2CH_2—$ | 4 | 1 | 1 | $—CH_2CH_2—$ | — | 1 | 164 |
| 65 | 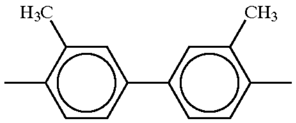 | 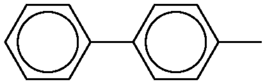 | $—CH_2CH_2—$ | 3 | 1 | 1 | 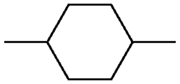 | — | 1 | 90 |
| 66 | 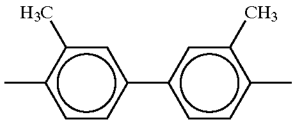 | 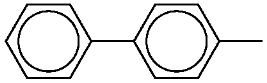 | $—CH_2CH_2—$ | 4 | 1 | 1 | $—CH_2CH_2—$ | — | 1 | 94 |
| 67 | 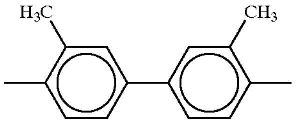 | 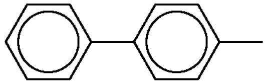 | $—CH_2CH_2—$ | 4 | 1 | 1 | 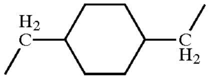 | 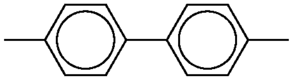 | 1 | 94 |

TABLE 8-continued
| Compound | A: X | A: Ar | A: T | A: Bonding position | A: k | A: n | Y | Z | m | p |
|---|---|---|---|---|---|---|---|---|---|---|
| 68 | 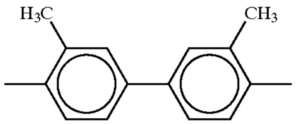 | 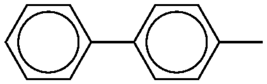 | — | 4 | 1 | 0 | $—CH_2CH_2—$ | — | 1 | 101 |
| 69 | 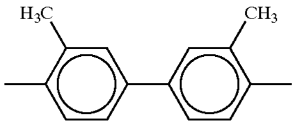 | 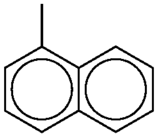 | $—CH_2CH_2—$ | 4 | 1 | 1 | 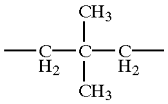 | — | 1 | 103 |
| 70 | 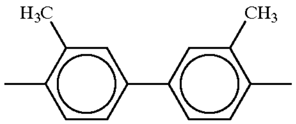 | 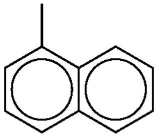 | 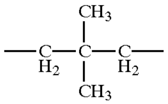 | 4 | 1 | 1 | $—CH_2CH_2—$ | — | 1 | 130 |

TABLE 9
| | A | | | | | | | | | |
|---|---|---|---|---|---|---|---|---|---|---|
| Compound | X | Ar | T | Bonding position | k | n | Y | Z | m | p |
| 71 | 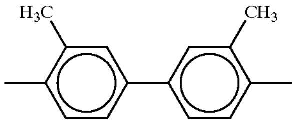 | 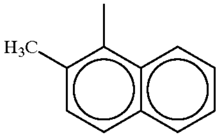 | —$CH_2CH_2$— | 4 | 1 | 1 | 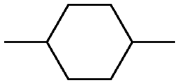 | — | 1 | 99 |
| 72 | 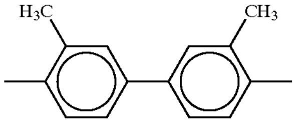 | 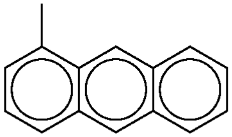 | —$CH_2$— | 4 | 1 | 1 | 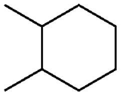 | — | 1 | 104 |
| 73 | 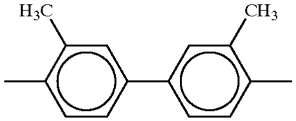 | 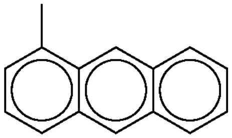 | —$CH_2CH_2$— | 1 | 1 | 1 | —$CH_2CH_2$— | — | 1 | 95 |
| 74 | 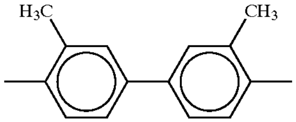 | 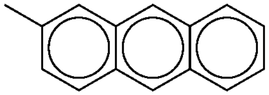 | —$CH_2$— | 4 | 1 | 1 | —$CH_2CH_2$— | — | 1 | 87 |
| 75 | 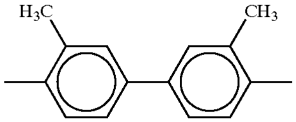 | 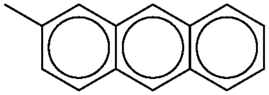 | —$CH_2CH_2$— | 4 | 1 | 1 | —$CH_2CH_2$— | — | 1 | 110 |

TABLE 9-continued
| Compound | A | | | | | | Y | Z | m | p |
|---|---|---|---|---|---|---|---|---|---|---|
| | X | Ar | T | Bonding position | k | n | | | | |
| 76 | 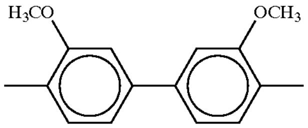 | 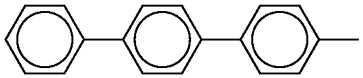 | $—CH_2CH_2—$ | 4 | 1 | 1 | $—CH_2CH_2—$ | — | 1 | 120 |
| 77 | 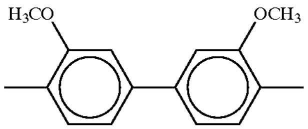 | 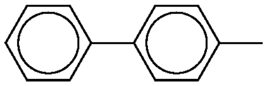 | $—CH_2CH_2—$ | 4 | 1 | 1 | $—CH_2CH_2—$ | — | 1 | 124 |
| 78 | 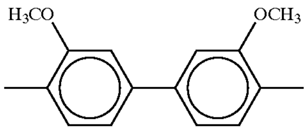 | 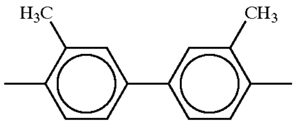 | $—CH_2CH_2—$ | 4 | 1 | 1 | $—CH_2CH_2—$ | — | 1 | 102 |

TABLE 10
| Com-pound | A: X | A: Ar | A: T | A: Bonding position | A: k | A: n | Y | Z | m | p |
|---|---|---|---|---|---|---|---|---|---|---|
| 79 | 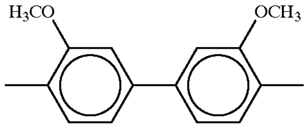 | 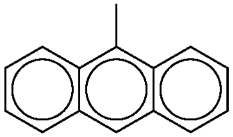 | $-CH_2CH_2-$ | 4 | 1 | 1 | $-CH_2CH_2-$ | — | 1 | 99 |
| 80 | 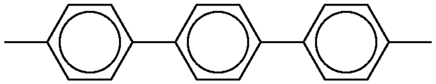 | 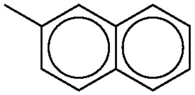 | $-CH_2CH_2-$ | 4 | 1 | 1 | $-CH_2CH_2-$ | — | 1 | 124 |
| 81 | 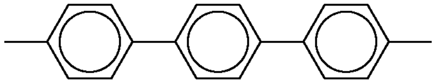 | 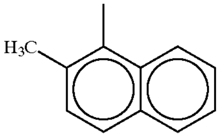 | $-CH_2CH_2-$ | 4 | 1 | 1 | $-CH_2CH_2-$ | — | 1 | 94 |
| 82 | 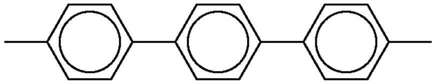 | 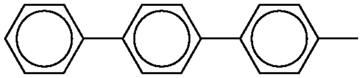 | $-CH_2-$ | 4 | 1 | 1 | $-CH_2CH_2-$ | — | 1 | 87 |
| 83 | 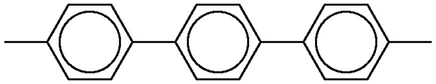 | 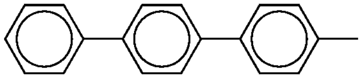 | $-CH_2CH_2-$ | 4 | 1 | 1 | $-CH_2CH_2-$ | — | 2 | 75 |

TABLE 10-continued
| Compound | A: X | A: Ar | A: T | A: Bonding position | A: k | A: n | Y | Z | m | p |
|---|---|---|---|---|---|---|---|---|---|---|
| 84 | 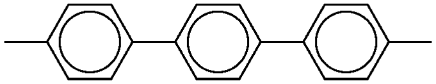 | 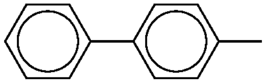 | $—CH_2CH_2—$ | 4 | 1 | 1 | $—CH_2CH_2—$ | — | 1 | 148 |
| 85 | 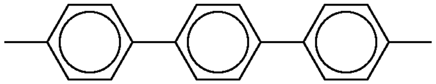 | 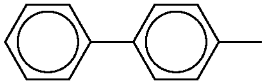 | $—CH_2CH_2—$ | 4 | 1 | 1 | 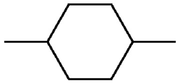 | 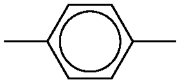 | 1 | 40 |
| 86 | 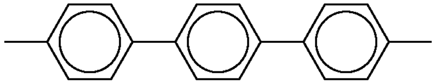 | 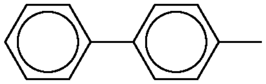 | — | 4 | 1 | 0 | $—CH_2CH_2—$ | — | 1 | 50 |
| 87 | 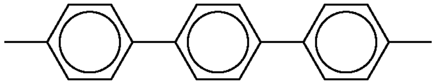 | 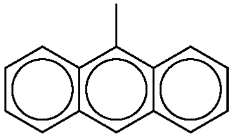 | $—CH_2CH_2—$ | 4 | 1 | 1 | $—CH_2CH_2—$ | — | 1 | 116 |
| 88 | 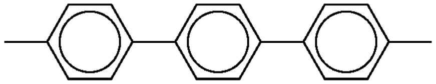 | 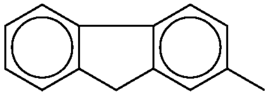 | $—CH_2CH_2—$ | 4 | 1 | 1 | $—CH_2CH_2—$ | — | 1 | 75 |

TABLE 11

| | A | |
|---|---|---|
| Compound | X | Ar |
| 89 | 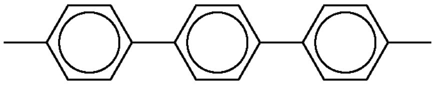 | 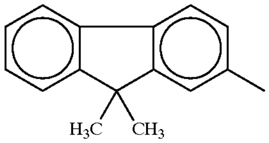 |
| 90 | 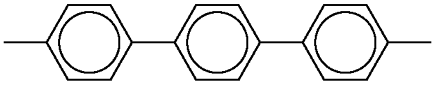 | 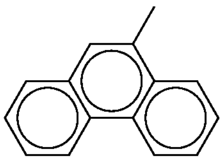 |
| 91 | 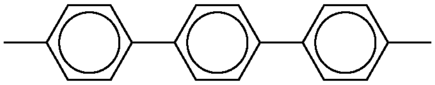 | 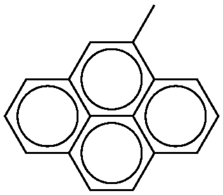 |

| | A | | | | | | | |
|---|---|---|---|---|---|---|---|---|
| Compound | T | Bonding position | k | n | Y | Z | m | p |
| 89 | $-CH_2CH_2-$ | 4 | 1 | 1 | $-CH_2CH_2-$ | — | 1 | 140 |
| 90 | $-CH_2CH_2-$ | 4 | 1 | 1 | $-CH_2CH_2-$ | — | 1 | 134 |
| 91 | $-CH_2CH_2-$ | 4 | 1 | 1 | $-CH_2CH_2-$ | — | 1 | 99 |

The following will describe examples of a process for synthesizing the charge-transporting polymer of the invention. However, the synthesizing process is not limited to the examples.

First, a monomer used in the synthesis of the charge-transporting polymer of the invention will be described.

The monomer used in the synthesis of the charge-transporting polymer of the invention can easily be synthesized by reacting an arylamine with a halogenated carboalkoxyalkylbenzene or a halogenated carboalkoxybenzene to synthesize a diarylamine and then reacting this diarylamine with a bishalogenated benzidine or the like, or reacting an arylamine, diarylbenzidine or the like with a halogenated carboalkoxyalkylbenzene or a halogenated carboalkoxybenzene.

About a synthesis of a charge-transporting material having an alkylenecarboxylic acid ester, JP-A No. 5-80550 describes a process of introducing a chloromethyl group to a skeleton, producing a Grignard reagent with Mg, converting the reagent into a carboxylic acid with carbon dioxide, and esterifying the acid. In this process, however, the reactivity of the chloromethyl group is high, therefore, the chloromethyl group cannot be introduced from the initial stage of raw material synthesis. It is therefore necessary to form a skeleton of a triarylamine, a tetraarylbenzidine or the like, and convert the methyl group introduced at the initial stage of raw material synthesis to a chloromethyl, or use a unsubstituted starting material, form a tetraarylbenzidine skeleton, and introduce a functional group such as a formyl group thereto by a substitution reaction to the aromatic ring, reduce the resultant to prepare an alcohol, and convert the $-CH_2OH$ group of the alcohol to a chloromethyl group with a halogenating reagent such as thionyl chloride, or perform direct chloromethylation with paraformaldehyde and hydrochloric acid.

However, the charge-transporting material having a skeleton of a triarylamine, a tetraarylbenzidine or the like has a very high reactivity, therefore, according to the process of chloromethylation of the introduced methyl group, a substitution reaction of halogen to the aromatic ring is easily caused. As a result, it is substantially impossible to chlorinate only the methyl group selectively. According to the process of using a unsubstituted starting material, introducing a functional group such as a formyl group thereto, and converting the functional group to a chloromethyl group, or the direct chloromethylation process, the chloromethyl group can be introduced to only the para-position with respect to the nitrogen atom. Accordingly, an alkylenecarboxylic acid ester group can be introduced to only the para-position with respect to the nitrogen atom. In the process of the introduction of a formyl group and subsequent conversion of the group to a chloromethyl group, the steps of the reactions are too long. On the other hand, the process of reacting an arylamine, diarylbenzidine or the like with a halogenated carboalkoxyalkylbenzene to yield a monomer is superior because it is easy to change the position of a substituent to control ionization potential or the like. Thus, it becomes possible to control physical properties of the charge-transporting polymer of the invention.

Since the monomer used in the synthesis of the charge-transporting polymer of the invention can have one or more selected from various substituents at arbitrary position(s)

and is chemically stable, the monomer can easily be handled. Thus, the above-mentioned problems can be solved.

Next, processes for synthesizing the charge-transporting polymer of the invention will be described in detail.

Specifically, the charge-transporting polymer of the invention can be synthesized, for example, by polymerizing a charge-transporting monomer represented by the general formula (VII-1) in a known manner described in, for example, "Zikken Kagaku Koza Vol. 28 ($4^{th}$ version)". In the general formula (VII-1), Ar, X, T, k and n have the same meanings as Ar, X, T, k and n in the general formula (II-1). A' represents a hydroxyl group, a halogen atom, the group —O—$R_{13}$ wherein $R_{13}$ represents an alkyl group, a substituted or unsubstituted aryl group, or an aralkyl group.

(VII-1)

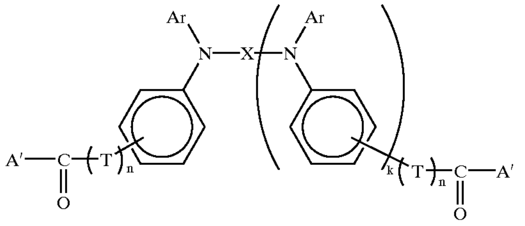

For example, the charge-transporting polymer of the invention can be synthesized as follows.

(1) In the Case in Which A' is a Hydroxyl Group:

In this case, a bivalent alcohol represented by HO—(Y—O)$_m$—H is mixed with the monomer in substantially equivalent amounts, and they are polymerized with an acid catalyst. As the acid catalyst, a catalyst which is used for ordinary esterifying reaction can be used. Examples thereof include sulfuric acid, toluene sulfonic acid, and trifluoroacetic acid. The catalyst is used in an amount of 1/10,000 to 1/10 part by weight, and preferably 1/1,000 to 1/50 part by weight per part by weight of the charge-transporting monomer. In order to remove water produced in the synthesis, it is preferable to use a solvent azeotropic with water. Effective examples thereof include toluene, chlorobenzene and 1-chloronaphthalene. The solvent is used in an amount of 1 to 100 parts by weight, and preferably 2 to 50 parts by weight per part by weight of the charge-transporting monomer. Reaction temperature can be arbitrarily set. In order to remove water produced in the polymerization, it is preferable to conduct the reaction at the boiling point of the solvent. In the case in which no solvent has been used, the resultant product is dissolved in a suitable solvent after the end of the reaction. In the case in which the solvent is used, the reaction solution is dropped, as it is, into a poor solvent, in which a charge-transporting polymer is not easily dissolved, for example, acetone, or an alcohol such as methanol or ethanol, so as to precipitate the charge-transporting polymer. The charge-transporting polymer is isolated and subsequently the polymer is sufficiently washed with water or an organic solvent and dried. If necessary, a reprecipitation treatment, which comprises the steps of dissolving the polymer in a suitable organic solvent and dropping the solution into a poor solvent to precipitate the charge-transporting polymer, may be repeated. In the reprecipitation treatment, it is preferable to perform stirring effectively with a mechanical stirrer or the like. The solvent for dissolving the charge-transporting polymer in the reprecipitation treatment is used in an amount of 1 to 100 parts by weight, and preferably 2 to 50 parts by weight per part by weight of the charge-transporting polymer. The poor solvent is used in an amount of 1 to 1,000 parts by weight, and preferably 10 to 500 parts by weight per part by weight of the charge-transporting polymer.

(2) In the Case in Which A' Is a Halogen:

In this case, a bivalent alcohol represented by HO—(Y—O)$_m$—H is mixed with the monomer in substantially equivalent amounts, and they are polymerized with an organic basic catalyst such as pyridine or triethylamine. The organic basic catalyst is used in an amount of 1 to 10 equivalents, and preferably 2 to 5 equivalents per part by weight of the charge-transporting monomer. As a solvent, methylene chloride, tetrahydrofuran (THF), toluene, chlorobenzene, 1-chloronaphthalene or the like is effective. The solvent is used in an amount of 1 to 100 parts by weight, and preferably 2 to 50 parts by weight per part by weight of the charge-transporting monomer. Reaction temperature can be arbitrarily set. After the polymerization, reprecipitation treatment is conducted as described above, so as to perform purification. In the case in a bivalent alcohol having a high acidity, such as bisphenol, interfacial polymerization may be used. That is, water is added to the bivalent alcohol and an equivalent amount of a base is added thereto, so as to dissolve the base. Thereafter, the solution is vigorously stirred and simultaneously a charge-transporting monomer is added to the solution. The amount of the monomer is an amount equivalent to the bivalent alcohol. At this time, water is used in an amount of 1 to 1,000 parts by weight, and preferably 2 to 500 parts by weight per part by weight of the bivalent alcohol. Effective examples of the solvent for dissolving the charge-transporting monomer include methylene chloride, dichloroethane, trichloroethane, toluene, chlorobenzene, and 1-chloronaphthalene. Reaction temperature can be arbitrarily set. In order to promote the reaction, it is effective to use a phase transfer catalyst such as an ammonium salt or a sulfonium salt. The phase transfer catalyst is used in an amount of 0.1 to 10 parts by weight, and preferably 0.2 to 5 parts by weight per part by weight of the charge-transporting monomer.

(3) In the Case in Which A' is —O—$R_{13}$:

In this case, an excessive amount of a bivalent alcohol represented by HO—(Y—O)$_m$—H is added to the monomer, and then the solution is heated with, as a catalyst, an inorganic acid such as sulfuric acid or phosphoric acid, a titanium alkoxide, an acetate or carbonate of calcium, cobalt or the like, or zinc oxide, so as to perform ester interchange. In this way, a charge-transporting polymer can be synthesized. The bivalent alcohol is used in an amount of 2 to 100 equivalents, and preferably 3 to 50 equivalents per equivalent of the charge-transporting monomer. The catalyst is used in an amount of 1/1,000 to 1 part by weight, and preferably 1/100 to ½ part by weight per part by weight of the charge-transporting monomer. The reaction is conducted at a reaction temperature of 200 to 300° C. After the end of the ester interchange from the group —O—$R_{13}$ to the group —O—(Y—O—)$_m$—H, in order to promote polymerization reaction by elimination of the group HO—(Y—O—)$_m$—H, the reaction is preferably conducted under reduced pressure. A high boiling point solvent which can be azeotropic with the group HO—(Y—O—)$_m$—H, such as 1-chloronaphthalene, can be used to remove the group HO—(Y—O—)$_m$—H under reduced pressure and simultaneously the reaction can be advanced.

The charge-transporting polymer of the invention can also be synthesized as follows. In each of the above-mentioned cases, a compound represented by the following general formula (VIII-1) is produced by adding an excessive amount of a bivalent alcohol to the monomer represented by the general formula (VII-1) and reacting them with each other. Thereafter, this is used as a charge-transporting monomer and reacted with a bivalent carboxylic acid or a bivalent carboxylic acid halide or the like. In this way, a charge-transporting polymer can be obtained. In the general formula (VIII-1), Ar, X, T, k and n have the same meanings as Ar, X, T, k and n in the general formula (II-1). Y represents a bivalent hydrocarbon group, and m is an integer of 1 to 5.

(VIII-1)

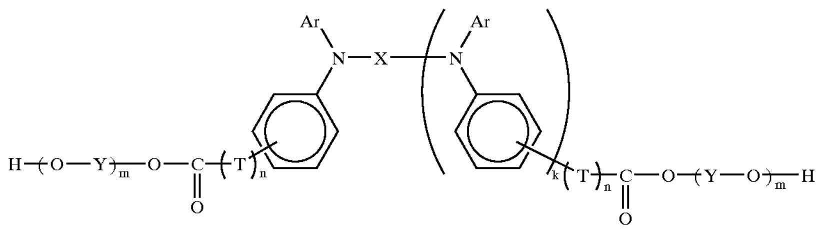

As described above, the charge-transporting polymer of the invention can easily be synthesized.

The charge-transporting polymer of the invention has a good charge transportability and a high glass transition temperature. Thus, the polymer can be suitably used for various organic electronic devices such as an electrophotographic photoconductor, a photoelectric transducer, and an organic transistor. The charge-transporting polymer of the invention is also superior in solubility and film-formability and can easily be synthesized. Therefore, a large-area organic electronic device can easily be produced.

When the charge-transporting polymer of the invention is applied to an electrophotographic photoconductor, the photoconductor can exhibit excellent light-response speed and thermal endurance. Thus, the invention is very useful.

EXAMPLES

The present invention will be more specifically described by way of Examples hereinafter. However, the invention is not limited by the Examples.

Synthesis Example 1

Synthesis of N,N'-bis(1-naphtyl)-N,N'-bis[4-(2-methoxycarbonylethyl)phenyl]-[1,1'-biphenyl)-4,4'-diamine Into a 100 ml of a flask were charged 9.0 g of N-(1-naphtyl)-N-[4-(2-methoxycarbonylethyl)phenyl]amine, 4.4 g of 3,3'-dimethyl-4,4'-diiodobiphenyl, 3.2 g of potassium carbonate, 0.5 g of copper sulfate pentahydrate and 50 ml of n-tridecane, and the mixture was heated and stirred at 230° C. under nitrogen gas flow for 8 hours. After the reaction, the mixture was cooled to room temperature, and dissolved into 20 ml of toluene. The insolubles were filtrated off with celite, and the filtrate was purified by silica gel column chromatography using toluene, so as to yield N,N'-bis(1-naphtyl)-N,N'-bis[4-(2-methoxycarbonylethyl)phenyl]-[1,1'-biphenyl]-4,4'-diamine as a white crystal.

m.p.: 117 to 120° C., and

IR spectrum: shown in FIG. 1

Synthesis Example 2

Synthesis of N,N'-bis[(4-phenyl)phenyl]-N,N'-bis[4-(2-methoxycarbonylethyl)phenyl]-[1,1'-biphenyl]-4,4'-diamine Into a 100 ml of a flask were charged 7.0 g of N-[(4-phenyl)phenyl]-N-[4-(2-methoxycarbonylethyl)phenyl]amine, 5.3 g of 4,4'-diiodobiphenyl, 3.9 g of potassium carbonate, 0.3 g of copper sulfate pentahydrate and 10 ml of n-tridecane, and the mixture was heated and stirred at 230° C. under nitrogen gas flow for 8 hours. After the reaction, the mixture was cooled to room temperature, and dissolved into 100 ml of toluene. The insolubles were filtrated off with celite, and the filtrate was purified by silica gel column chromatography using toluene, so as to yield N,N'-bis[(4-phenyl)phenyl]-N,N'-bis[4-(2-methoxycarbonylethyl)phenyl]-[1,1'-biphenyl]-4,4'-diamine as a light yellow crystal.

m.p.: 103 to 105° C., and

Figure 2:
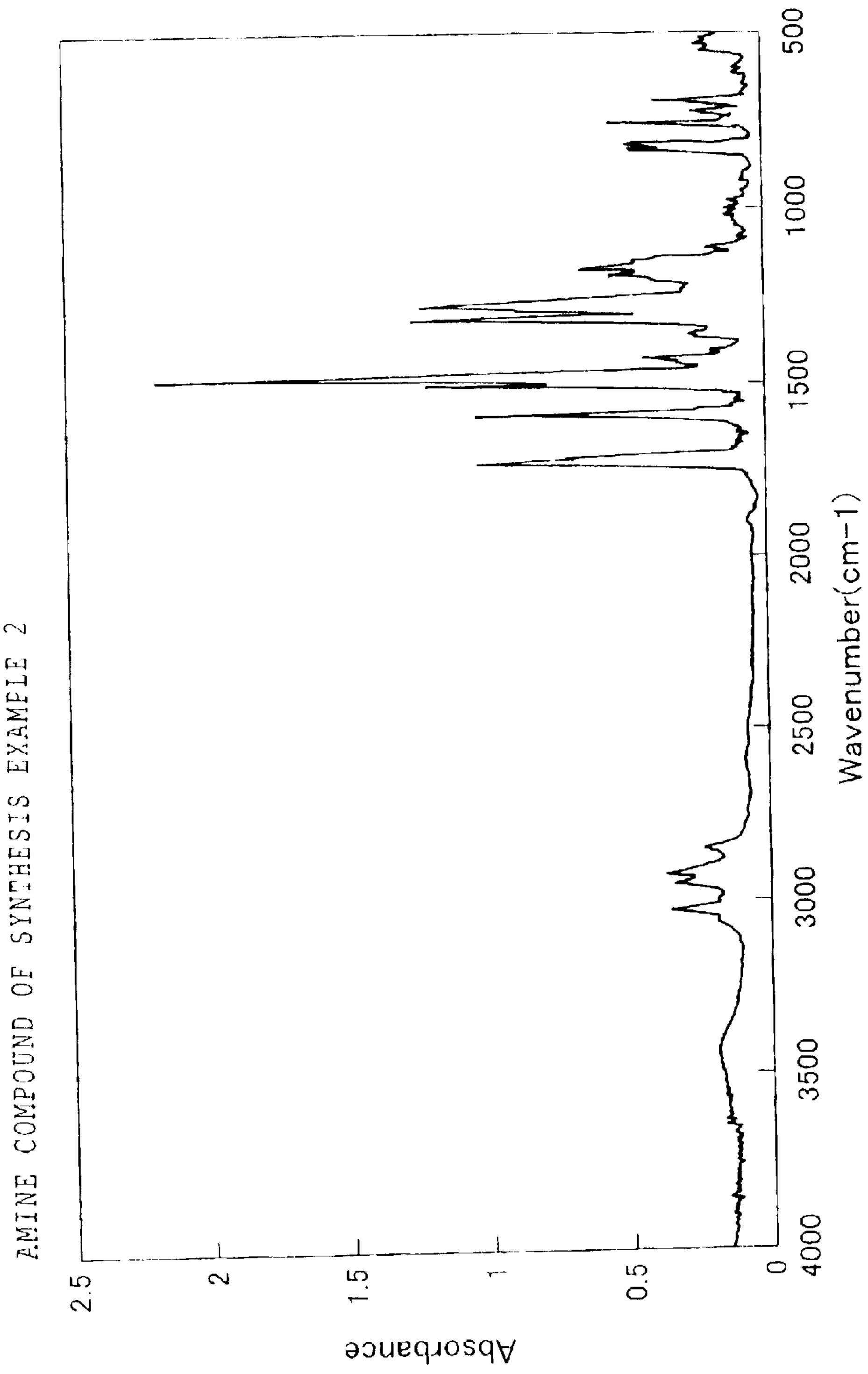
FIG. 2 is a graph showing an IR spectrum of an amine compound of Synthesis Example 2.

IR spectrum: shown in FIG. 2

Synthesis Example 3

Synthesis of N,N'-bis[(4-biphenyl)phenyl]-N,N'-bis[4-(2-methoxycarbonylethyl)phenyl]-[1,1'-biphenyl]-4,4'-diamine Into a 100 ml of a flask were charged 8.0 g of N-terphenyl-N-[4-(2-methoxycarbonylethyl)phenyl]amine, 3.8 g of 4,4'-diiodobiphenyl, 2.8 g of potassium carbonate, 0.2 g of copper sulfate pentahydrate and 50 ml of n-tridecane, and the mixture was heated and stirred at 230° C. under nitrogen gas flow for 8 hours. After the reaction, the mixture was cooled to room temperature, and dissolved into 20 ml of toluene. The insolubles were filtrated off with celite, and the filtrate was purified by silica gel column chromatography using toluene, so as to yield N,N'-bis[(4-biphenyl)phenyl]-N,N'-bis[4-(2-methoxycarbonylethyl)phenyl]-[1,1'-biphenyl]-4,4'-diamine as a white crystal.

m.p.: 123 to 127° C., and

Figure 3:
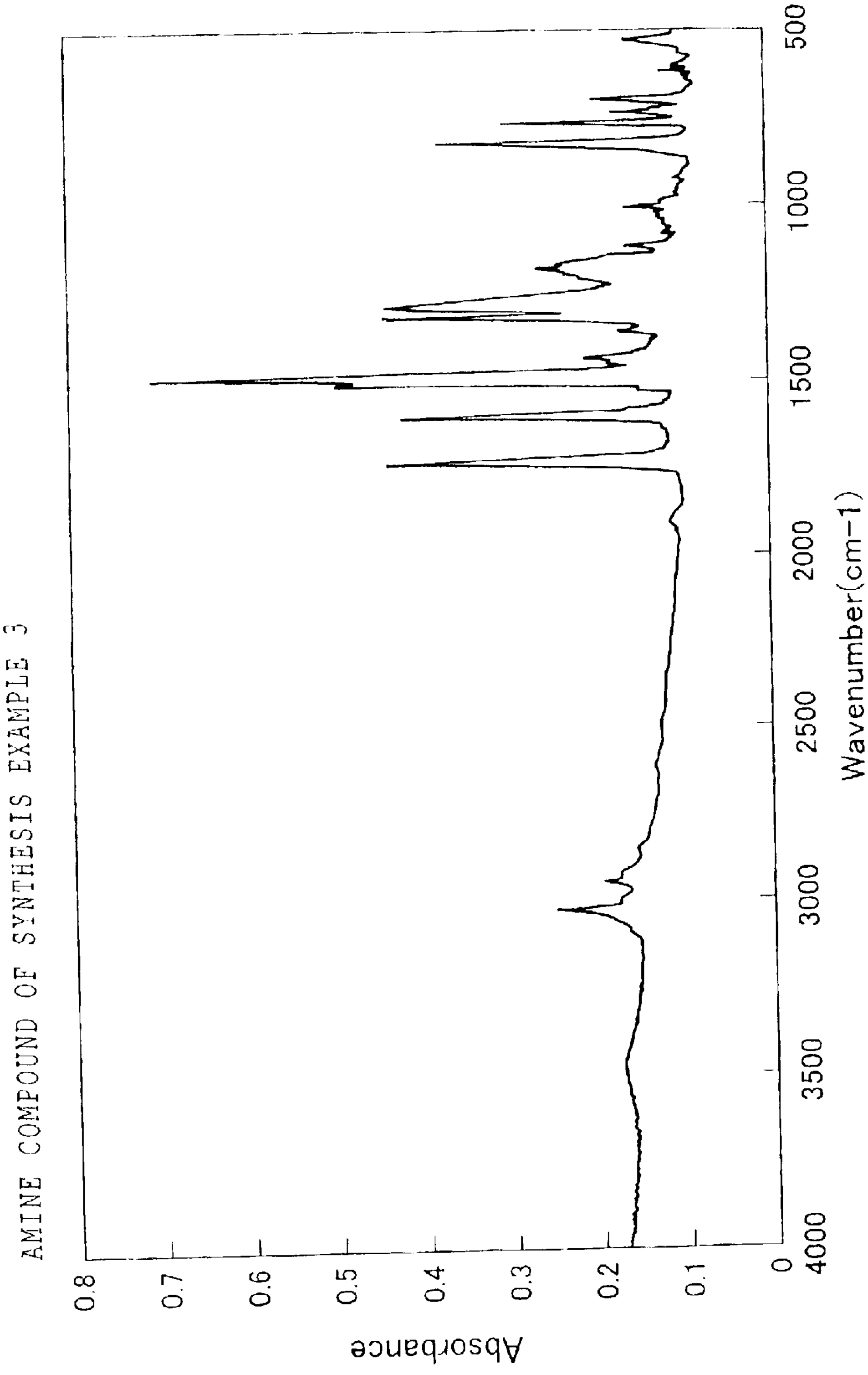
FIG. 3 is a graph showing an IR spectrum of an amine compound of Synthesis Example 3.

IR spectrum: shown in FIG. 3

Synthesis Example 4

Figure 4:
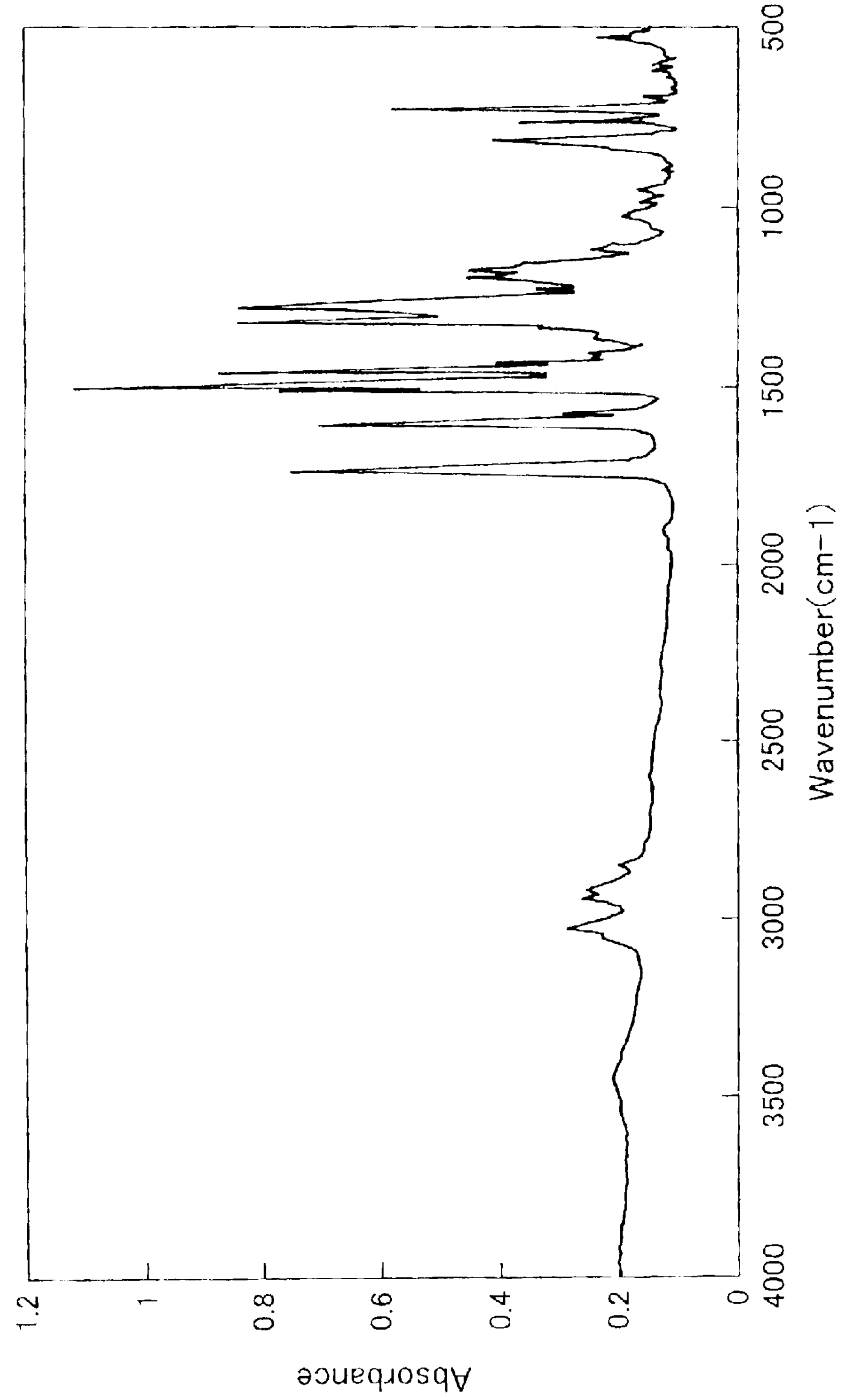
FIG. 4 is a graph showing an IR spectrum of an amine compound of Synthesis Example 4.

Synthesis of N,N'-bisfluorenyl-N,N'-bis[4-(2-methoxycarbonylethyl)phenyl]-[1,1'-biphenyl]-4,4'-diamine Into a 100 ml of a flask were charged 3.5 g of N-fluorenyl-N-[4-(2-methoxycarbonylethyl)phenyl]amine, 1.9 g of diiodobiphenyl, 1.6 g of potassium carbonate, 0.1 g of copper sulfate pentahydrate and 50 ml of n-tridecane, and the mixture was heated and stirred at 230° C. under nitrogen gas flow for 8 hours. After the reaction, the mixture was cooled to room temperature, and dissolved into 100 ml of toluene. The insolubles were filtrated off with celite, and the filtrate was purified by silica gel column chromatography using toluene, so as to yield N,N'-bisfluorenyl-N,N'-bis[4-(2-methoxycarbonylethyl)phenyl]-[1,1'-biphenyl]-4,4'-diamine as a yellow crystal.

m.p.: 127 to 129° C., and IR spectrum: shown in FIG. 4

Synthesis Example 5

Synthesis of 3,3'-dimethyl-N,N'-bis[(4-biphenyl)phenyl]-N,N'-bis[4-(2-methoxycarbonylethyl)phenyl]-[1,1'-biphenyl]-4,4'-diamine Into a 100 ml of a flask were charged 9.0 g of N-[(4-biphenyl)phenyl]-N-[4-(2-methoxycarbonylethyl)phenyl]

amine, 4.4 g of 3,3'-dimethyl-4,4'-diiodobiphenyl, 3.5 g of potassium carbonate, 0.3 g of copper sulfate pentahydrate and 50 ml of n-tridecane, and the mixture was heated and stirred at 230° C. under nitrogen gas flow for 16 hours. After the reaction, the mixture was cooled to room temperature, and dissolved into 100 ml of toluene. The insolubles were filtrated off with celite, and the filtrate was purified by silica gel column chromatography using toluene, so as to yield 3,3'-dimethyl-N,N'-bis[(4-biphenyl)phenyl]-N,N'-bis[4-(2-methoxycarbonylethyl)phenyl]-[1,1'-biphenyl]-4,4'-diamine as a white ctrystal.

m.p.: 220 to 221° C., and

Figure 5:
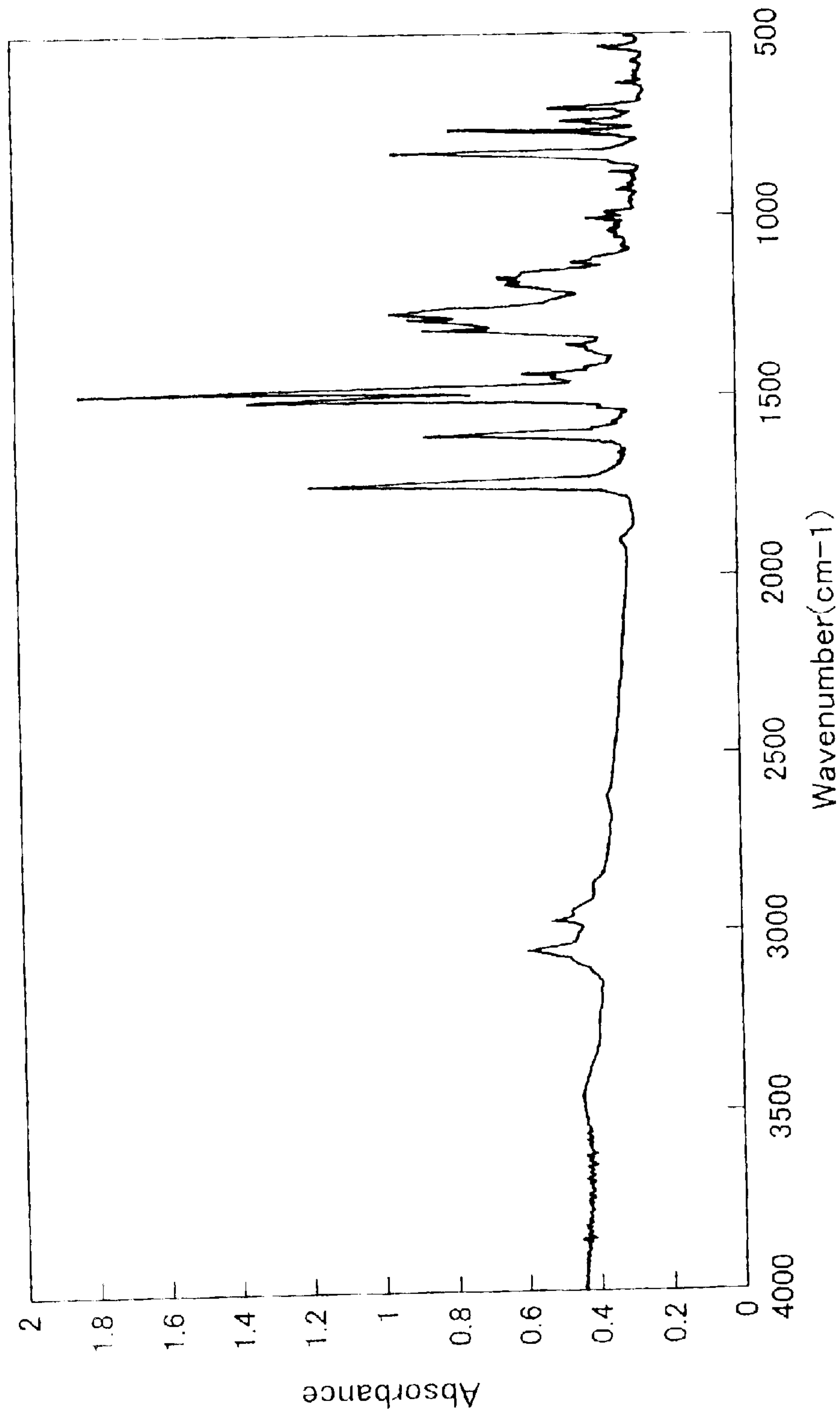
FIG. 5 is a graph showing an IR spectrum of an amine compound of Synthesis Example 5.

IR spectrum: shown in FIG. 5

Synthesis Example 6

Synthesis of N,N'-bis(1-naphtyl)-N,N'-bis[4-(2-methoxycarbonylethyl)phenyl]-[1,1'-terphenyl]-4,4'-diamine Into a 100 ml of a flask were charged 9.0 g of N-(1-naphtyl)-N-[4-(2-methoxycarbonylethyl)phenyl]amine, 4.4 g of 4,4'-diiodoterphenyl, 3.2 g of potassium carbonate, 0.5 g of copper sulfate pentahydrate and 50 ml of n-tridecane, and the mixture was heated and stirred at 230° C. under nitrogen gas flow for 8 hours. After the reaction, the mixture was cooled to room temperature, and dissolved into 20 ml of toluene. The insolubles were filtrated off with celite, and the filtrate was purified by silica gel column chromatography using toluene, so as to yield N,N'-bis(1-naphtyl)-N,N'-bis [4-(2-methoxycarbonylethyl)phenyl]-[1,1"-terphenyl]-4,4'-diamine as a white crystal.

m.p.: 175 to 178° C., and

Figure 6:
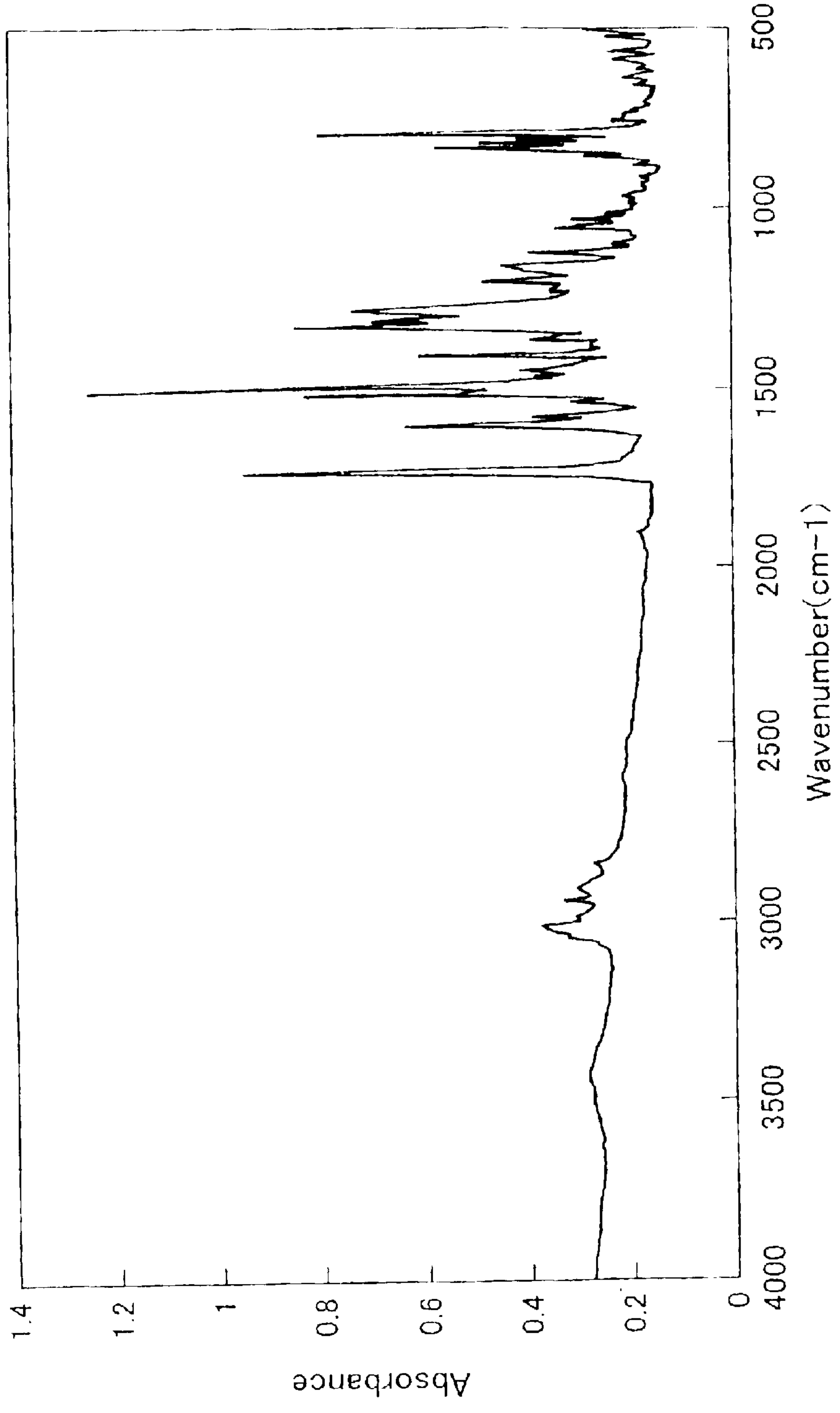
FIG. 6 is a graph showing an IR spectrum of an amine compound of Synthesis Example 6.

IR spectrum: shown in FIG. 6

Synthesis Example 7

Synthesis of N,N'-bis[(4-phenyl)phenyl]-N,N'-bis[4-(2-methoxycarbonylethyl)phenyl]-[1,1"-terphenyl]-4,4'-diamine Into a 100 ml of a flask were charged 9.0 g of N-[(4-phenyl)phenyl]-N-[4-(2-methoxycarbonylethyl)phenyl] amine, 4.3 g of 4,4'-diiodoterphenyl, 3.0 g of potassium carbonate, 0.4 g of copper sulfate pentahydrate and50 ml of n-tridecane, and the mixture was heated and stirred at 230° C. under nitrogen gas flow for 8 hours. After the reaction, the mixture was cooled to room temperature, and dissolved into 20 ml of toluene. The insolubles were filtrated off with celite, and the filtrate was purified by silica gel column chromatography using toluene, so as to yield N,N'-bis[(4-phenyl)phenyl]-N,N'-bis[4-(2-methoxycarbonylethyl) phenyl]-[1,1"-terphenyl]-4,40-diamine as a white crystal.

m.p.: 139 to 141° C., and

Figure 7:
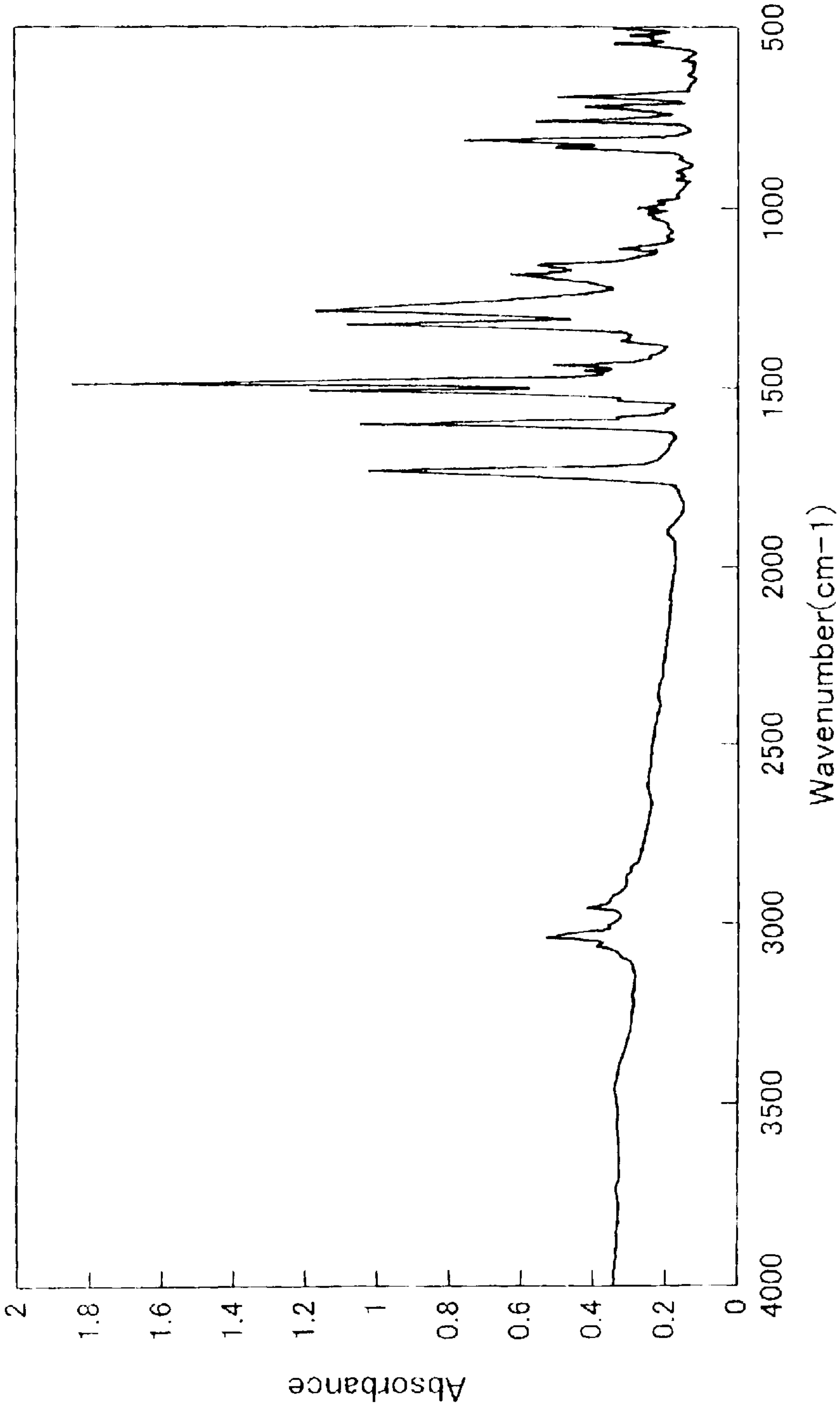
FIG. 7 is a graph showing an IR spectrum of an amine compound of Synthesis Example 7.

IR spectrum: shown in FIG. 7

Synthesis Example 8

Synthesis of N,N'-bisphenanthrenyl-N,N'-bis[4-(2-methoxycarbonylethyl)phenyl]-[1,1'-biphenyl]-4,4'-diamine Into a 200 ml of a flask were charged 8.5 g of N-phenanthrenyl-N-[4-(2-methoxycarbonylethyl)phenyl] amine, 4.4 g of 4,4'-diiodobiphenyl, 3.8 g of potassium carbonate, 0.3 g of copper sulfate pentahydrate and 50 ml of n-tridecane, and the mixture was heated and stirred at 230° C. under nitrogen gas flow for 15 hours. After the reaction, the mixture was cooled to room temperature, and dissolved into 50 ml of toluene. The insolubles were filtrated off with celite, and the filtrate was purified by silica gel column chromatography using toluene, so as to yield N,N'-bisphenanthrenyl-N,N'-bis[4-(2-methoxycarbonylethyl) phenyl]-[1,1'-biphenyl]-4,4'-diamine as a white crystal.

m.p.: 181 to 182° C., and

Figure 8:
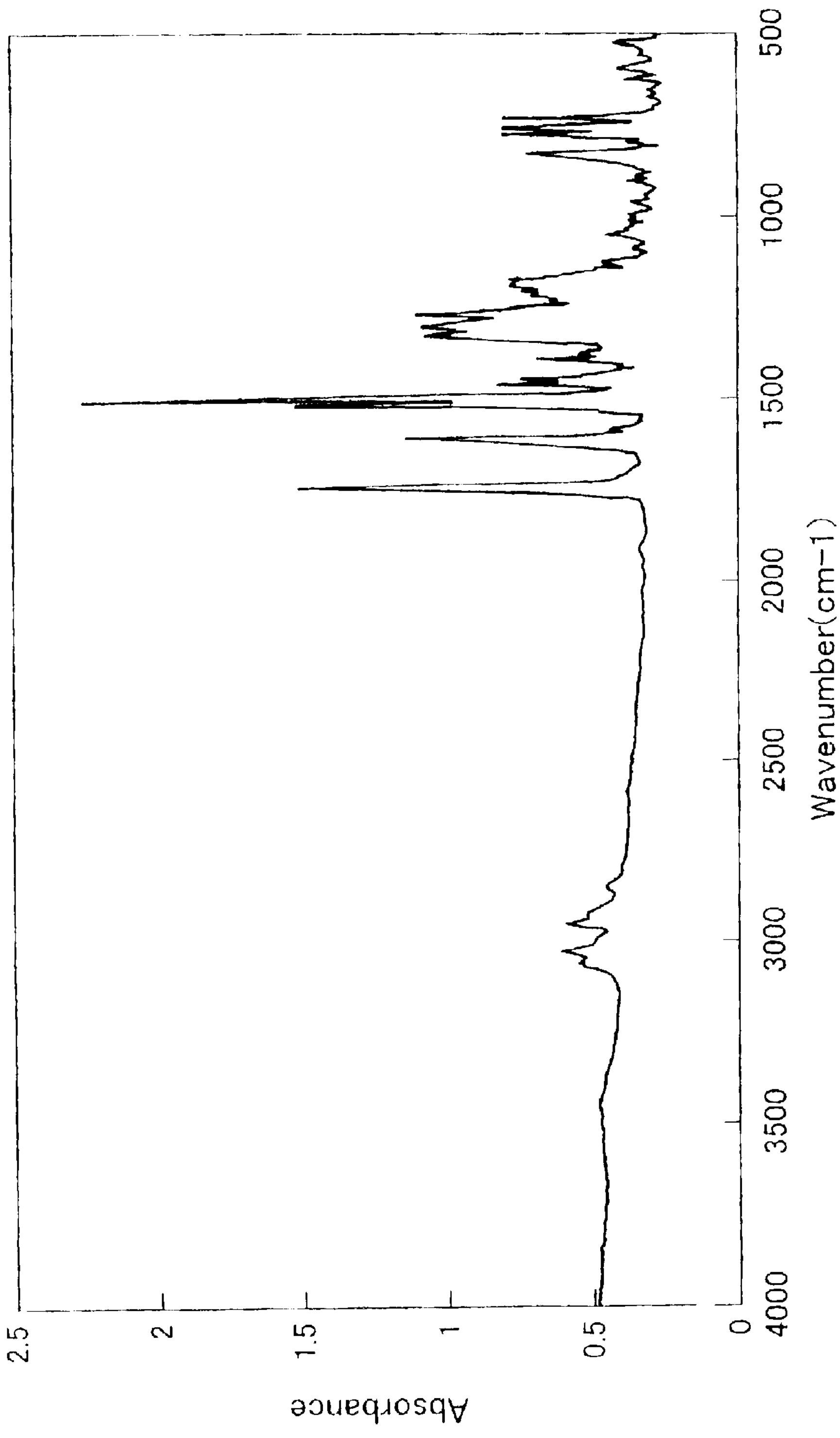
FIG. 8 is a graph showing an IR spectrum of an amine compound of Synthesis Example 8.

IR spectrum: shown in FIG. 8

Synthesis Example 9

Synthesis of N,N'-bisfluorenyl-N,N'-bis[4-(2-methoxycarbonylethyl)phenyl]-[1,1"-terphenyl]-4,4'-diamine Into a 100 ml of a flask were charged 5 g of N-fluorenyl-N-[4-(2-methoxycarbonylethyl)phenyl]amine, 3.0 g of 4,4'-diiodoterphenyl, 3.0 g of potassium carbonate, 0.2 g of copper sulfate pentahydrate and 20 ml of n-tridecane, and the mixture was heated and stirred at 230° C. under nitrogen gas flow for 10 hours. After the reaction, the mixture was cooled to room temperature, and dissolved into 50 ml of toluene. The insolubles were filtrated off with celite, and the filtrate was purified by silica gel column chromatography using toluene, so as to yield N,N'-bisfluorenyl-N,N'-bis[4-(2-methoxycarbonylethyl)phenyl]-[1,1"-terphenyl]-4,4'-diamine as a light yellow crystal.

m.p.: 180 to 183° C., and

Figure 9:
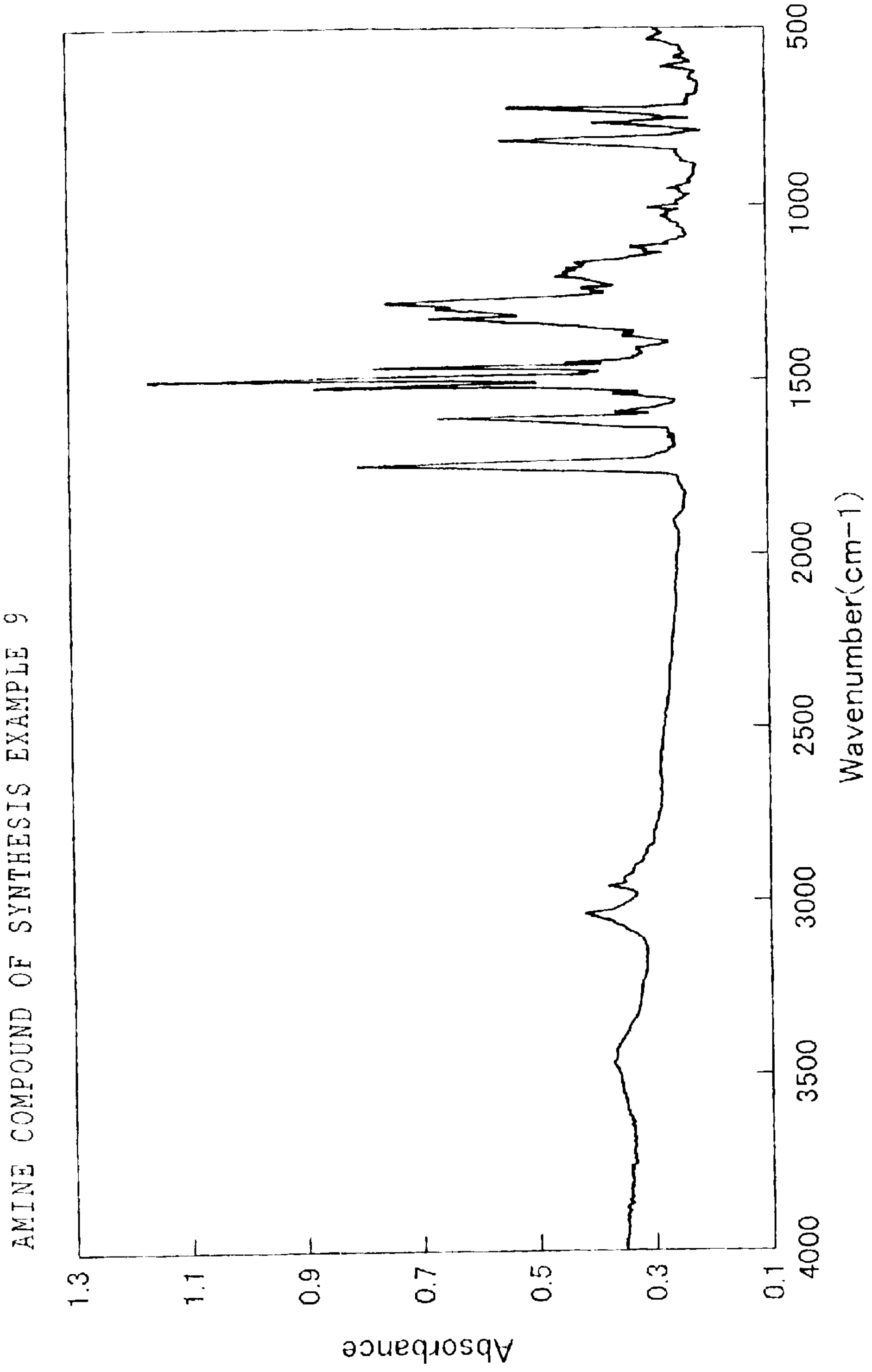
FIG. 9 is a graph showing an IR spectrum of an amine compound of Synthesis Example 9.

IR spectrum: shown in FIG. 9

Synthesis Example 10

Synthesis of N,N'-bisphenanthrenyl-N,N'-bis[4-(2-methoxycarbonylethyl)phenyl]-[1,1"-terphenyl]-4,4'-diamine Into a 100 ml of a flask were charged 5 g of N-phenanthrenyl-N-[4-(2-methoxycarbonylethyl)phenyl] amine, 3.0 g of 4,4'-diiodoterphenyl, 3.0 g of potassium carbonate, 0.2 g of copper sulfate pentahydrate and 20 ml of n-tridecane, and the mixture was heated and stirred at 230° C. under nitrogen gas flow for 10 hours. After the reaction, the mixture was cooled to room temperature, and dissolved into 50 ml of toluene. The insolubles were filtrated off with celite, and the filtrate was purified by silica gel column chromatography using toluene, so as to yield N,N'-bisphenanthrenyl-N,N'-bis[4-(2-methoxycarbonylethyl) phenyl]-[1,1"-terphenyl]-4,4'-diamine as a white crystal.

m.p.: 144 to 145° C.

Synthesis Example 11

Synthesis of N,N'-bis(1-naphtyl)-N,N'-bis[4-(2-methoxycarbonyl)phenyl]-[1,1'-biphenyl]-4,4'-diamine Into a 100 ml of a flask were charged 5 g of N-(1-naphtyl)-N-[4-(2-methoxycarbonyl)phenyl]amine, 3.0 g of 4,4'-diiodobiphenyl, 3.0 g of potassium carbonate, 0.2 g of copper sulfate pentahydrate and 20 ml of n-tridecane, and the mixture was heated and stirred at 230° C. under nitrogen gas flow for 10 hours. After the reaction, the mixture was cooled to room temperature, and dissolved into 50 ml of toluene. The insolubles were filtrated off with celite, and the filtrate was purified by silica gel column chromatography using toluene, so as to yield N,N'-bis(1-naphtyl)-N,N'-bis [4-(2-methoxycarbonyl)phenyl]-[1,1'-biphenyl]-4,4'-diamine as a white crystal.

m.p.: 166 to 168° C.

Synthesis Example 12

Synthesis of N,N'-bis[(4-phenyl)phenyl]-N,N'-bis[4-(2-methoxycarbonyl)phenyl]-[1,1'-biphenyl]-4,4'-diamine- Into a 100 ml of a flask were charged 5 g of N-(4-phenyl) phenyl-N-[4-(2-methoxycarbonyl)phenyl]amine, 3.0 g of 4,4'-diiodobiphenyl, 3.0 g of potassium carbonate, 0.2 g of copper sulfate pentahydrate and 20 ml of n-tridecane, and the mixture was heated and stirred at 230° C. under nitrogen gas flow for 10 hours. After the reaction, the mixture was cooled to room temperature, and dissolved into 50 ml of toluene. The insolubles were filtrated off with celite, and the filtrate was purified by silica gel column chromatography using toluene, so as to yield N,N'-bis[(4-phenyl)phenyl]-N,N'-bis[4-(2-methoxycarbonyl)phenyl]-[1,1'-biphenyl]-4,4'-diamine as a white crystal.

m.p.: 175 to 177° C.

Example 1

Synthesis of a Charge-Transporting Polymer (17)

Into a 50 ml flask were charged 1.0 g of N,N'-bis(1-naphthyl)-N,N'-bis[4-(2-methoxycarbonylethyl)phenyl]-(1,1'-biphenyl]-4,4'-diamine, 2.0 g of ethylene glycol, and 0.05 g of tetrabutoxytitanium, and the mixture was heated and stirred at 200° C. under nitrogen gas flow for 3 hours. After it was checked that N,N'-bis(1-naphthyl)-N,N'-bis[4-(2-methoxycarbonylethyl)phenyl]-[1,1'-biphenyl]-4,4'-diamine was consumed, the reaction system was heated at 200° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a polytetrafluoroethylene (PTFE filter) filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.8 g of a charge-transporting polymer (17). The molecular weight thereof was measured by GPC. As a result, Mw thereof was $3.54\times10^4$ (in terms of styrene). The polymerization degree (p) thereof, which was calculated from the molecular weight of the monomer, was about 47.

Figure 10:
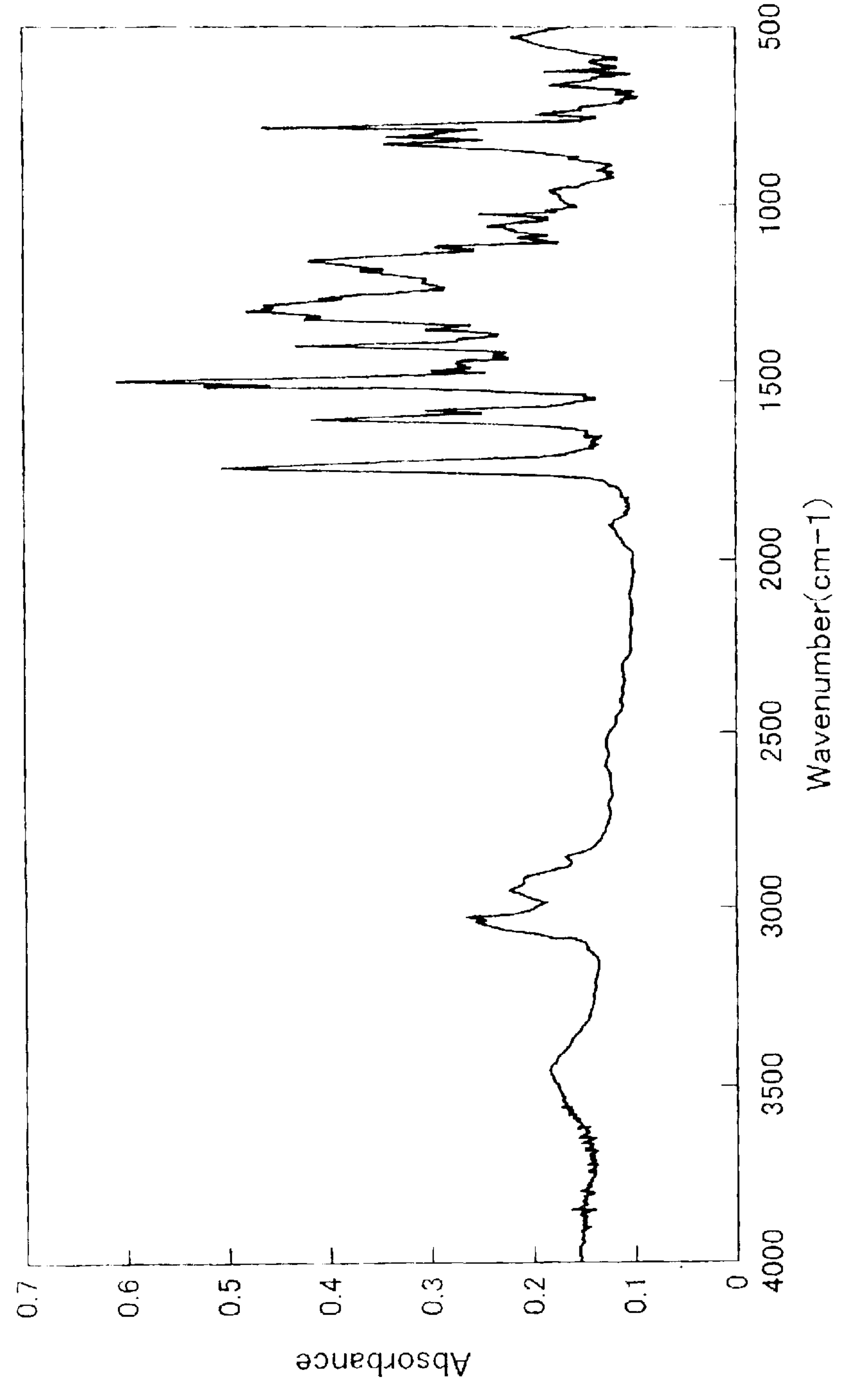
FIG. 10 is a graph showing an IR spectrum of a charge-transporting polymer (17) of Example 1.

The IR spectrum thereof is shown in FIG. 10.

Example 2

Synthesis of a Charge-Transporting Polymer (32)

Figure 11:
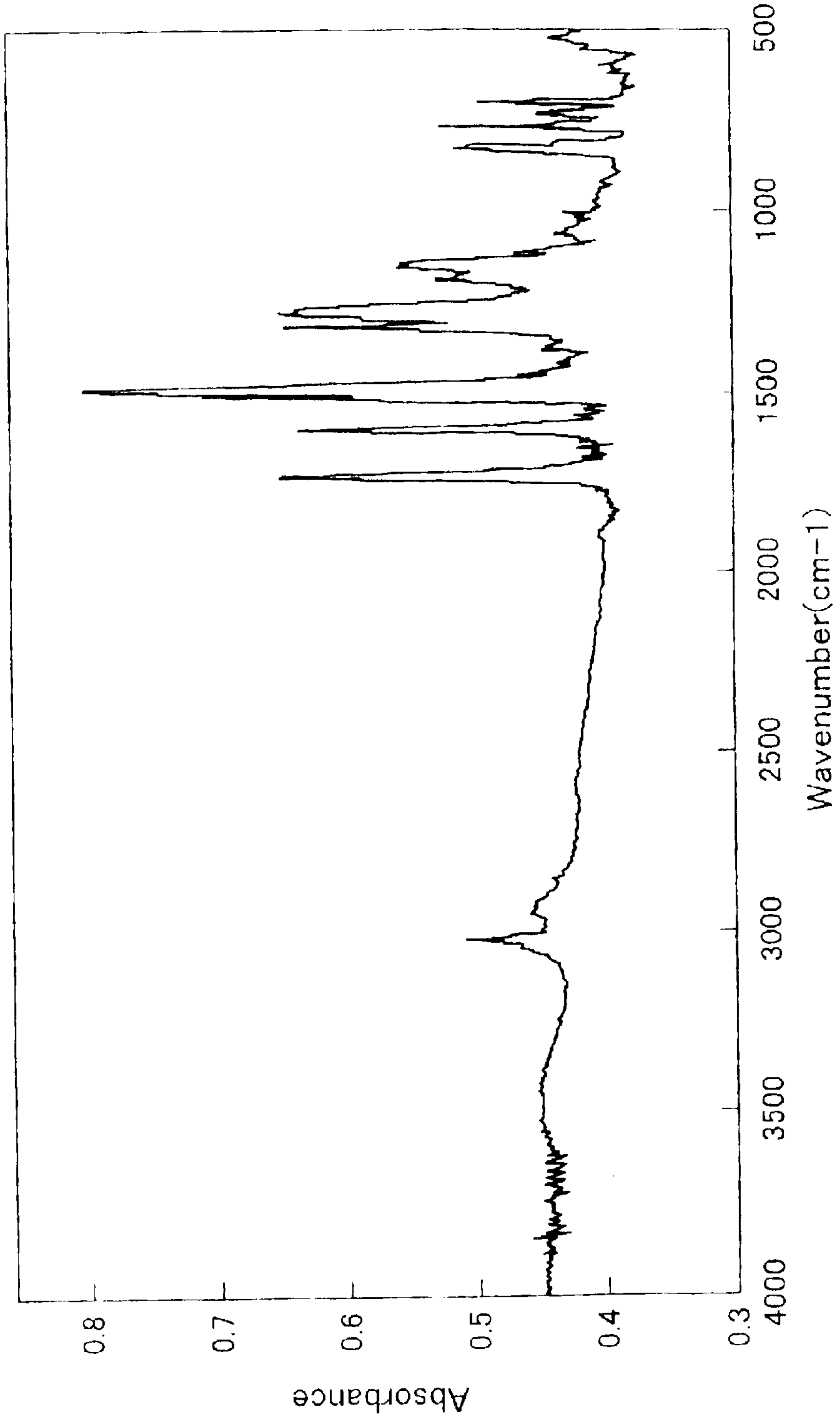
FIG. 11 is a graph showing an IR spectrum of a charge-transporting polymer (32) of Example 2.

Into a 50 ml flask were charged 1.0 g of N,N'-bis[(4-phenyl)phenyl]-N,N'-bis[4-(2-methoxycarbonyl)phenyl]-[1,1'-biphenyl]-4,4'-diamine, 2.0 g of ethylene glycol, and 0.05 g of tetrabutoxytitanium, and the mixture was heated and stirred at 200° C. under nitrogen gas flow for 3 hours. After it was checked that N,N'-bis[(4-phenyl)phenyl]-N,N'-bis[4-(2-methoxycarbonyl)phenyl]-[1,1'-biphenyl]-4,4'-diamine was consumed, the reaction system was heated at 200° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.9 g of a charge-transporting polymer (32). The molecular weight thereof was measured by GPC. As a result, Mw thereof was $3.10\times10^4$ (in terms of styrene) The polymerization degree (p) thereof, which was calculated from the molecular weight of the monomer, was about 38. The IR spectrum thereof is shown in FIG. 11.

Example 3

Synthesis of a Charge-Transporting Polymer (36)

Figure 12:
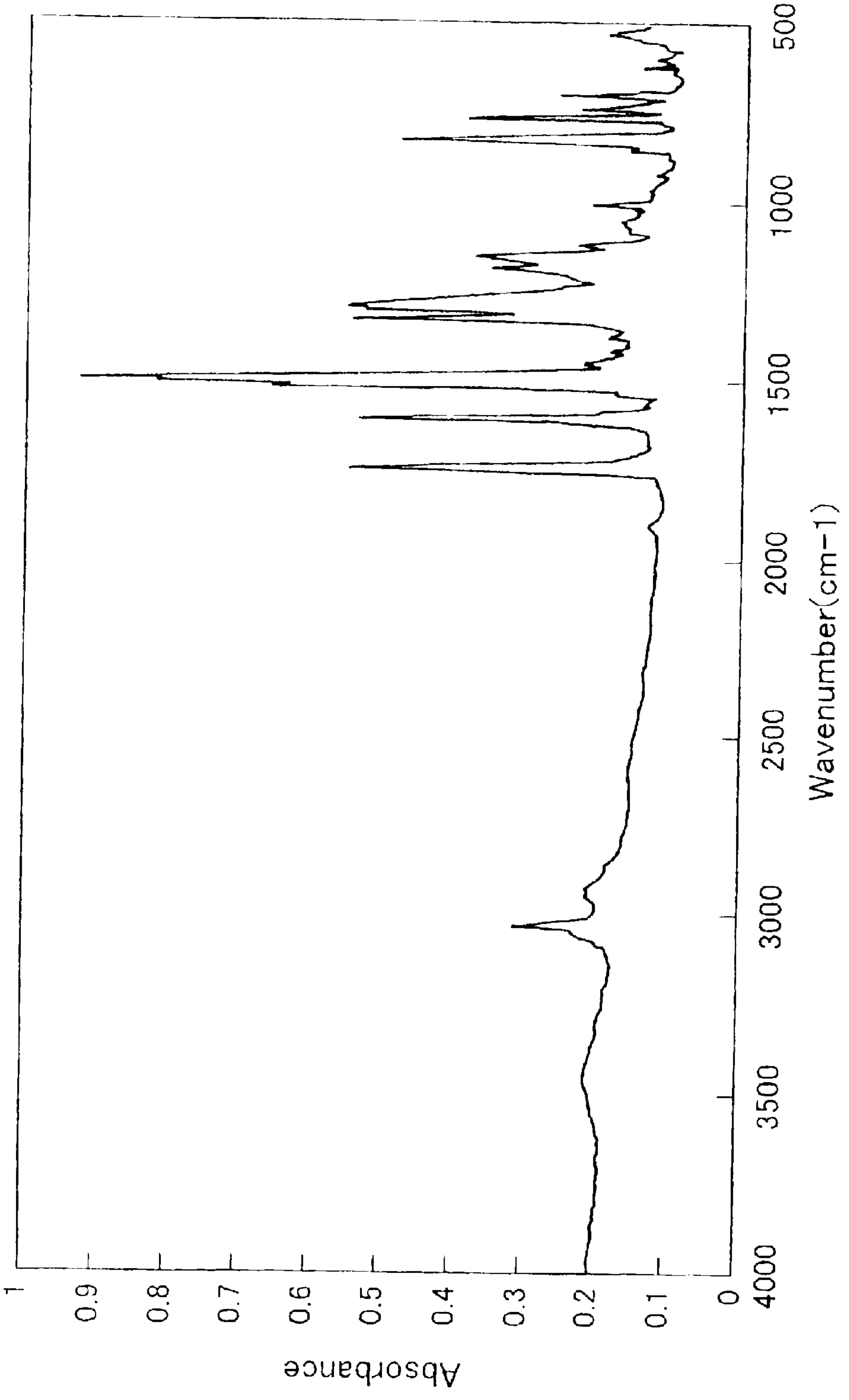
FIG. 12 is a graph showing an IR spectrum of a charge-transporting polymer (36) of Example 3.

Into a 50 ml flask were charged 1.0 g of N,N'-bis[(4-biphenyl)phenyl]-N,N'-bis[4-(2-methoxycarbonylethyl)phenyl]-[1,1'-biphenyl]-4,4'-diamine, 2.0 g of ethylene glycol, and 0.05 g of tetrabutoxytitanium, and the mixture was heated and stirred at 200° C. under nitrogen gas flow for 3 hours. After it was checked that N,N'-bis[(4-biphenyl)phenyl]-N,N'-bis[4-(2-methoxycarbonylethyl)phenyl]-[1,1'-biphenyl]-4,4'-diamine was consumed, the reaction system was heated at 200° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.7 g of a charge-transporting polymer (36). The molecular weight thereof was measured by GPC. As a result, Mw thereof was $2.72\times10^4$ (in terms of styrene) The polymerization degree (p) thereof, which was calculated from the molecular weight of the monomer, was about 28. The IR spectrum thereof is shown in FIG. 12.

Example 4

Synthesis of a Charge-Transporting polymer (24)

Figure 13:
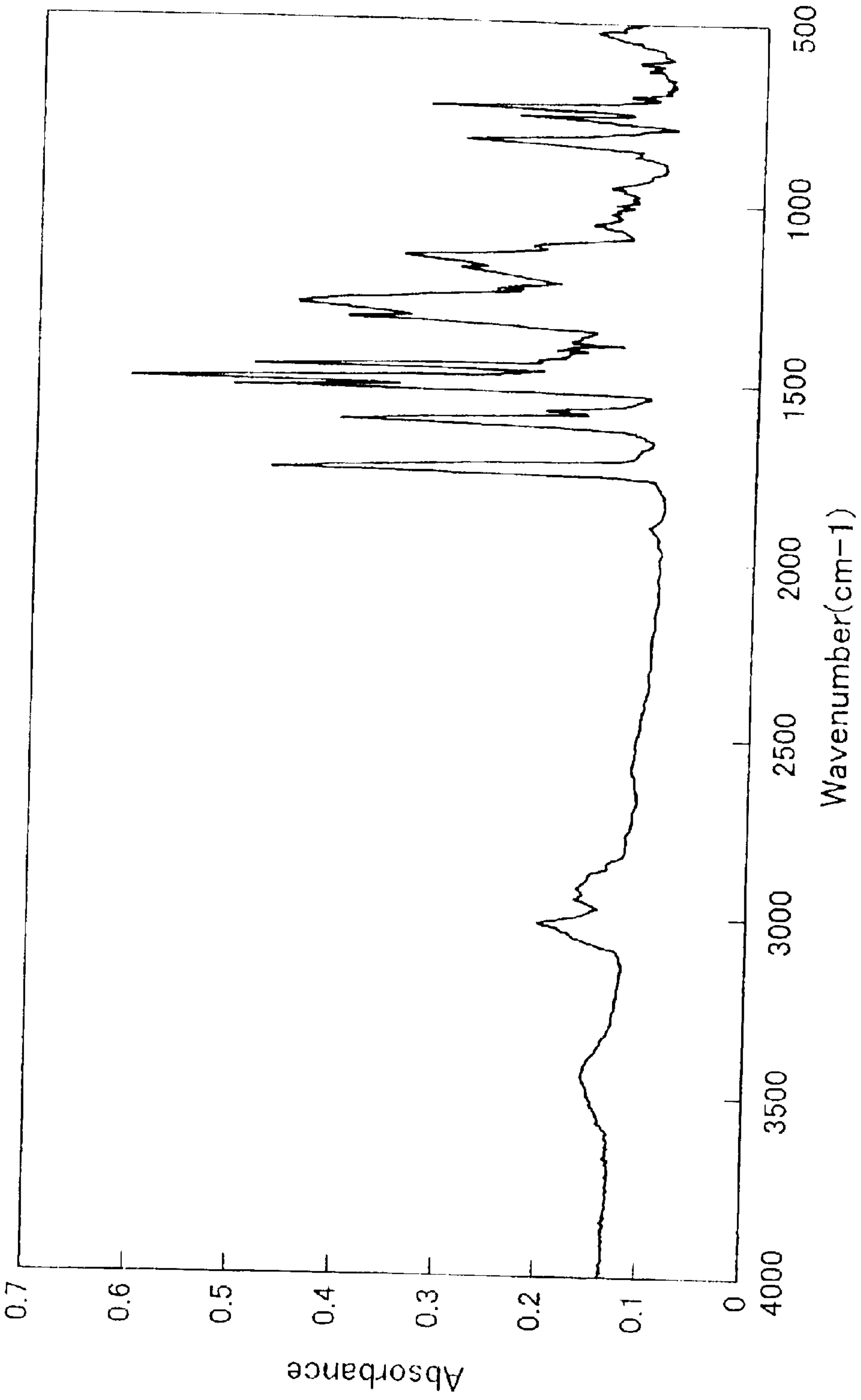
FIG. 13 is a graph showing an IR spectrum of a charge-transporting polymer (24) of Example 4.

Into a 50 ml flask were charged 1.0 g of N,N'-bisfluorenyl-N,N'-bis[4-(2-methoxycarbonylethyl)phenyl]-[1,1'-biphenyl]-4,4'-diamine, 2.0 g of ethylene glycol, and 0.05 g of tetrabutoxytitanium, and the mixture was heated and stirred at 200° C. under nitrogen gas flow for 3 hours. After it was checked that N,N'-bisfluorenyl-N,N'-bis[4-(2-methoxycarbonylethyl)phenyl]-[1,1'-biphenyl]-4,4'-diamine was consumed, the reaction system was heated at 220° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.9 g of a charge-transporting polymer (24). The molecular weight thereof was measured by GPC. As a result, Mw thereof was $4.70\times10^4$ (in terms of styrene) The polymerization degree (p) thereof, which was calculated from the molecular weight of the monomer, was about 56. The IR spectrum thereof is shown in FIG. 13.

Example 5

Synthesis of a Charge-Transporting Polymer (64)

Into a 50 ml flask were charged 0.8 g of 3,3'-dimethyl-N,N'-bis[(4-biphenyl)phenyl]-N,N'-bis[4-(2-methoxycarbonylethyl)phenyl]-[1,1'-biphenyl]-4,4'-diamine, 3.0 g of ethylene glycol, and 0.05 g of tetrabutoxytitanium, and the mixture was heated and stirred at 220° C. under nitrogen gas flow for 6 hours. After it was checked that 3,3'-dimethyl-N,N'-bis[(4-biphenyl)phenyl]-N,N'-bis[4-(2-methoxycarbonylethyl)phenyl]-[1,1'-biphenyl]-4,4'-diamine was consumed, the reaction system was heated at 230° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.74 g of a charge-transporting polymer (64). The molecular weight thereof was measured by GPC. As a result, Mw thereof was $1.63\times10^5$ (in terms of styrene) The polymerization degree (p) thereof, which was calculated from the molecular weight of the monomer, was about 164.

Example 6

Synthesis of a Charge-Transporting Polymer (80)

Figure 14:
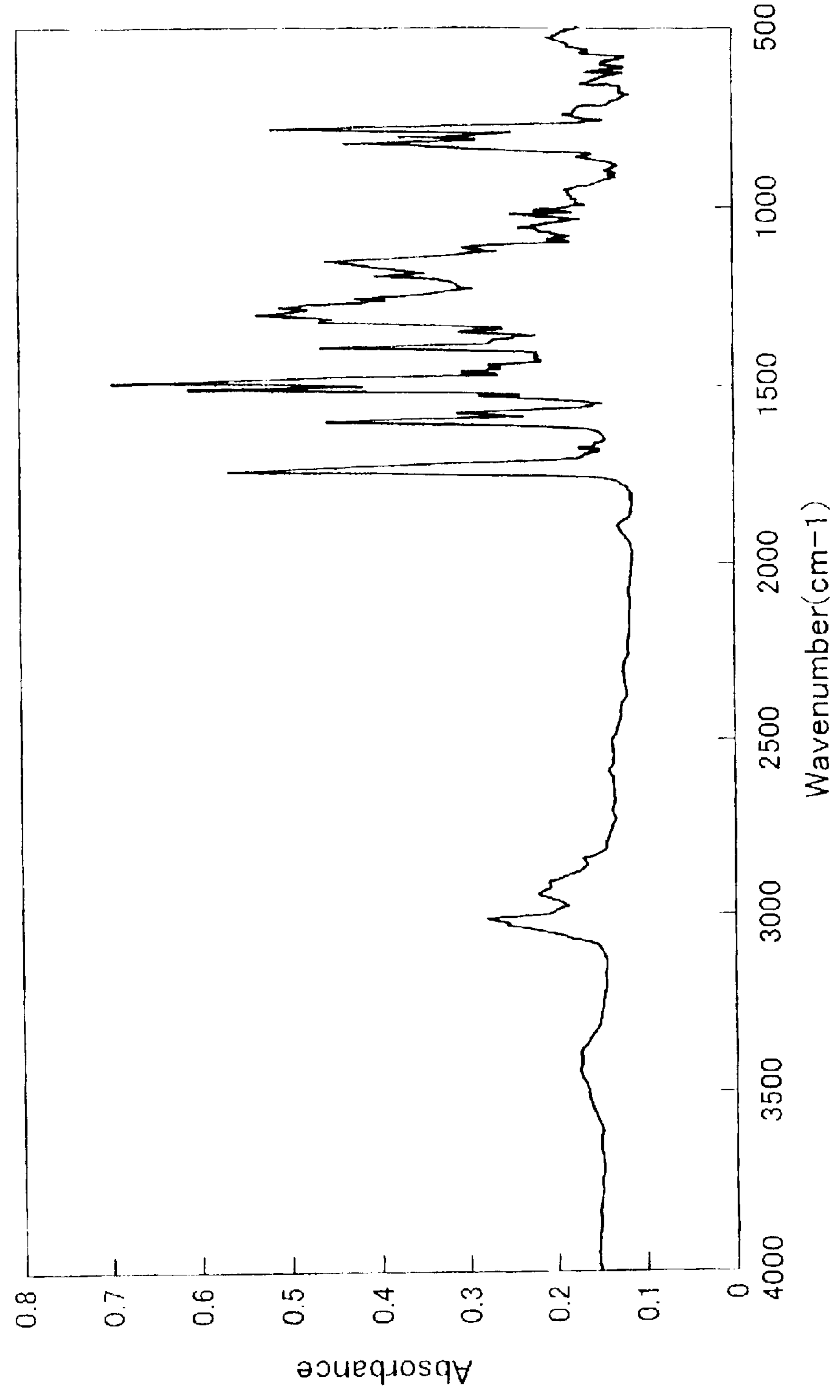
FIG. 14 is a graph showing an IR spectrum of a charge-transporting polymer (80) of Example 6.

Into a 50 ml flask were charged 1.0 g of N,N'-bis(1-naphtyl)-N,N'-bis[4-(2-methoxycarbonylethyl)phenyl]-[1,1"-terphenyl]4,4'-diamine, 3.0 g of ethylene glycol, and 0.05 g of tetrabutoxytitanium, and the mixture was heated and stirred at 200° C. under nitrogen gas flow for 3.5 hours. After it was checked that N,N'-bis(1-naphtyl)-N,N'-bis[4-(2-methoxycarbonylethyl)phenyl]-[1,1"-terphenyl]-4,4'-diamine was consumed, the reaction system was heated at 230° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.9 g of a charge-transporting polymer (80). The molecular weight thereof was measured by GPC. As a result, Mw thereof was $1.04\times10^5$ (in terms of styrene) The polymerization degree (p) thereof, which was calculated from the molecular weight of the monomer, was about 124. The IR spectrum thereof is shown in FIG. 14.

Example 7

Synthesis of a Charge-Transporting Polymer (84)

Figure 15:
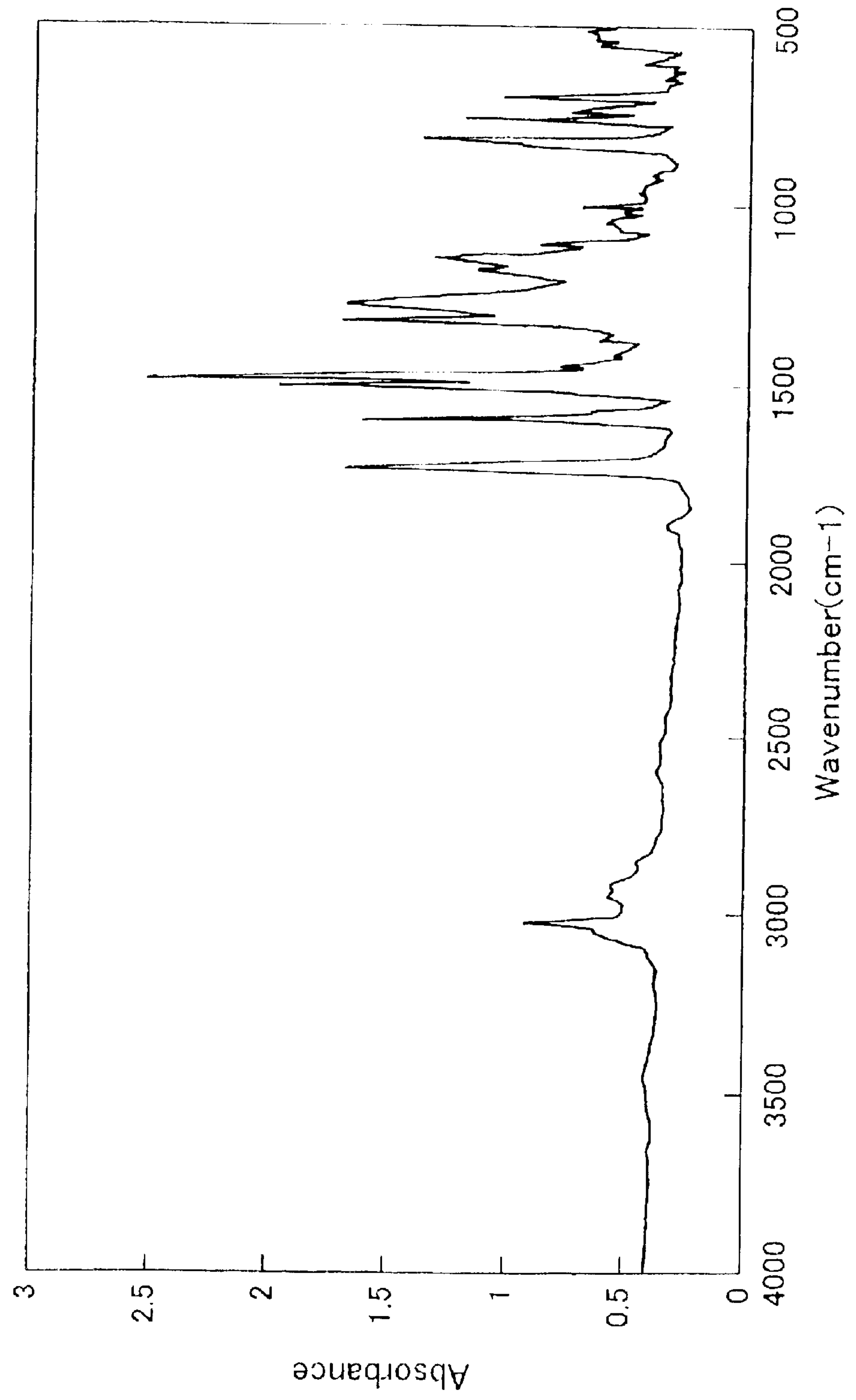
FIG. 15 is a graph showing s an IR spectrum of a charge-transporting polymer (84) of Example 7.

Into a 50 ml flask were charged 1.0 g of N,N'-bis[(4-phenyl)phenyl]-N,N'-bis[4-(2-methoxycarbonylethyl)phenyl]-[1,1"-terphenyl]-4,4'-diamine, 3.0 g of ethylene glycol, and 0.05 g of tetrabutoxytitanium, and the mixture was heated and stirred at 200° C. under nitrogen gas flow for 3 hours. After it was checked that N,N'-bis[(4-phenyl)phenyl]-N,N'-bis[4-(2-methoxycarbonylethyl)phenyl]-[1,1"-terphenyl]-4,4'-diamine was consumed, the reaction system was heated at 230° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.8 g of a charge-transporting polymer (84). The molecular weight thereof was measured by GPC. As a result, Mw thereof was $1.32\times10^5$ (in terms of styrene). The polymerization degree (p) thereof, which was calculated from the molecular weight of the monomer, was about 148. The IR spectrum thereof is shown in FIG. 15.

Example 8

Synthesis of a Charge-Transporting Polymer (46)

Into a 50 ml flask were charged 1.0 g of N,N'-bisphenanthrenyl-N,N'-bis[4-(2-methoxycarbonylethyl)phenyl]-[1,1'-biphenyl]-4,4'-diamine, 3.0 g of ethylene glycol, and 0.05 g of tetrabutoxytitanium, and the mixture was heated and stirred at 200° C. under nitrogen gas flow for 3 hours. After it was checked that N,N'-bisphenanthrenyl-N,N'-bis[4-(2-methoxycarbonylethyl)phenyl]-[1,1'-biphenyl]-4,4'-diamine was consumed, the reaction system was heated at 230° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.8 g of a charge-transporting polymer (46). The molecular weight thereof was measured by GPC. As a result, Mw thereof was $9.04\times10^4$ (in terms of styrene). The polymerization degree (p) thereof, which was calculated from the molecular weight of the monomer, was about 105.

Example 9

Synthesis of a Charge-Transporting Polymer (88)

Figure 16:
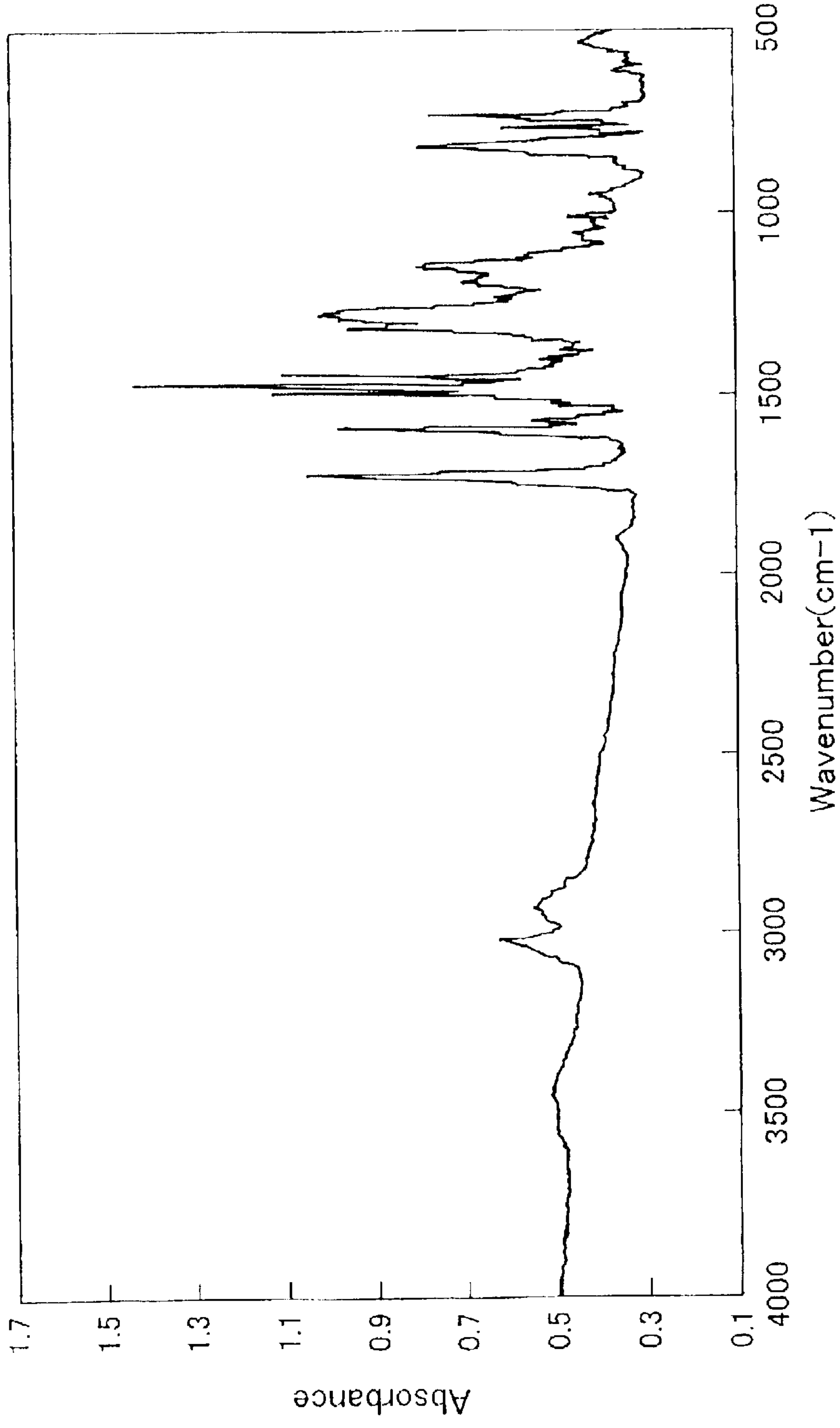
FIG. 16 is a graph showing an IR spectrum of a charge-transporting polymer (88) of Example 9.

Into a 50 ml flask were charged 1.0 g of N,N'-bisfluorenyl-N,N'-bis[4-(2-methoxycarbonylethyl)phenyl]-[1,1"-terphenyl]-4,4'-diamine, 5.0 g of ethylene glycol, and 0.05 g of tetrabutoxytitanium, and the mixture was heated and stirred at 200° C. under nitrogen gas flow for 4 hours. After it was checked that N,N'-bisfluorenyl-N,N'-bis[4-(2-methoxycarbonylethyl)phenyl]-[1,1"-terphenyl]-4,4'-diamine was consumed, the reaction system was heated at 230° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.8 g of a charge-transporting polymer (88). The molecular weight thereof was measured by GPC. As a result, Mw thereof was $6.86\times10^4$ (in terms of styrene). The polymerization degree (p) thereof, which was calculated from the molecular weight of the monomer, was about 75. The IR spectrum thereof is shown in FIG. 16.

Example 10

Synthesis of a Charge-Transporting Polymer (90)

Into a 50 ml flask were charged 1.0 g of N,N'-bisphenanthrenyl-N,N'-bis[4-(2-methoxycarbonylethyl)

phenyl]-[1,1"-terphenyl]-4,4'-diamine, 5.0 g of ethylene glycol, and 0.05 g of tetrabutoxytitanium, and the mixture was heated and stirred at 200° C. under nitrogen gas flow for 3 hours. After it was checked that N,N'-bisphenanthrenyl-N,N'-bis[4-(2-methoxycarbonylethyl)phenyl]-[1,1"-terphenyl]-4,4'-diamine was consumed, the reaction system was heated at 230° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.8 g of a charge-transporting polymer (90). The molecular weight thereof was measured by GPC. As a result, Mw thereof was $1.26 \times 10^5$ (in terms of styrene). The polymerization degree (p) thereof, which was calculated from the molecular weight of the monomer, was about 134.

Example 11

Synthesis of a Charge-Transporting Polymer (20)

Into a 50 ml flask were charged 1.0 g of N,N'-bis(1-naphtyl)-N,N'-bis[4-(2-methoxycarbonyl)phenyl]-[1,1'-biphenyl]-4,4'-diamine, 3.0 g of ethylene glycol, and 0.05 g of tetrabutoxytitanium, and the mixture was heated and stirred at 200° C. under nitrogen gas flow for 3 hours. After it was checked that N,N'-bis(1-naphtyl)-N,N'-bis[4-(2-methoxycarbonyl)phenyl]-[1,1'-biphenyl]-4,4'-diamine was consumed, the reaction system was heated at 230° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.8 g of a charge-transporting polymer (20). The molecular weight thereof was measured by GPC. As a result, Mw thereof was $7.12 \times 10^4$ (in terms of styrene). The polymerization degree (p) thereof, which was calculated from the molecular weight of the monomer, was about 101.

Example 12

Synthesis of a Charge-Transporting Polymer (35)

Into a 50 ml flask were charged 1.0 g of N,N'-bis[(4-phenyl)phenyl]-N,N'-bis[4-(2-methoxycarbonyl)phenyl]-[1,1'-biphenyl]-4,4'-diamine, 3.0 g of ethylene glycol, and 0.05 g of tetrabutoxytitanium, and the mixture was heated and stirred at 200° C. under nitrogen gas flow for 3 hours. After it was checked that N,N'-bis[(4-phenyl)phenyl]-N,N'-bis[4-(2-methoxycarbonyl)phenyl]-[1,1'-biphenyl]-4,4'-diamine was consumed, the reaction system was heated at 230° C. while the pressure in the system was reduced to 0.5 mmHg to distill off ethylene glycol. In this way, the reaction was continued for 4 hours. Thereafter, the reaction system was cooled to room temperature, and the reaction product was dissolved into 50 ml of toluene. The insolubles were filtrated off with a PTFE filter having a 0.5 μm mesh. The filtrate was dropwise added to 300 ml of methanol, which was being stirred. In this way, a polymer was precipitated. The resultant polymer was filtrated off, sufficiently washed with methanol, and dried to yield 0.8 g of a charge-transporting polymer (35). The molecular weight thereof was measured by GPC. As a result, Mw thereof was $7.49 \times 10^4$ (in terms of styrene) The polymerization degree (p) thereof, which was calculated from the molecular weight of the monomer, was about 99.

The glass transition temperatures of the charge-transporting polymers obtained in Examples 1 to 12 were measured with a differential scanning calorimeter (DSC) (Tg/DTA 6200, made by Seiko Instruments Inc.). The results are shown in Table 12. For reference, the glass transition temperatures of α-NPD (N,N'-diphenyl-N,N'-di(α-naphthyl)-benzidine), and m-TBD (N,N'-diphenyl-N,N'-di (m-tolyl)benzidine) are also shown.

TABLE 12

| | Charge-transporting polymer No. | Glass transition temperature (° C.) |
|---|---|---|
| Example 1 | (17) | 147 |
| Example 2 | (32) | 140 |
| Example 3 | (36) | 164 |
| Example 4 | (24) | 158 |
| Example 5 | (64) | 161 |
| Example 6 | (80) | 160 |
| Example 7 | (84) | 155 |
| Example 8 | (46) | 165 |
| Example 9 | (88) | 165 |
| Example 10 | (90) | 167 |
| Example 11 | (20) | 155 |
| Example 12 | (35) | 158 |
| Reference Example 1 | α-NPD | 95 |
| Reference Example 2 | m-TBD | 63 |

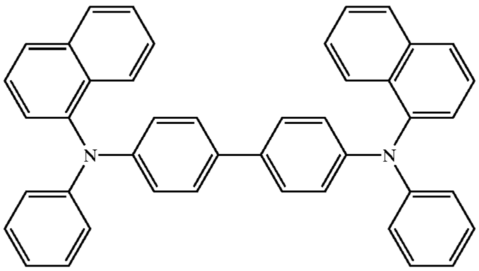

α-NPD

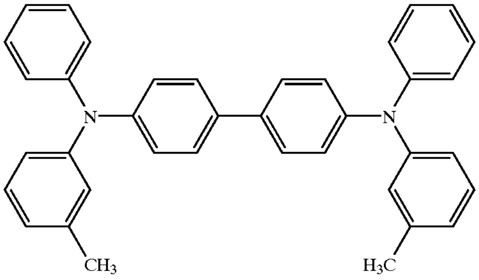

m-TBD

It can be understood from the results shown in Table 12 that all of the charge-transporting polymers of the invention have a high glass transition temperature.

Since the charge-transporting polymer represented by the general formula (I-1) or (I-2) has good charge transportability, excellent solubility and film-formability, and a high glass transition temperature (Tg), it can be understood that the polymer is a thermally stable compound. It can also be understood that the charge-transporting polymer represented by the general formula (I-1) or (I-2) is easily synthesized and physical properties such as ionization potential and Tg can be controlled by introduction of a substituent; therefore, the polymer is useful as a charge-transporting material used for organic electronic devices such as an electrophotographic photoconductor, a photoelectric transducer and an organic transistor.

What is claimed is:

1. A charge-transporting polymer represented by the following general formula (I-1) or (I-2):

(I-1)

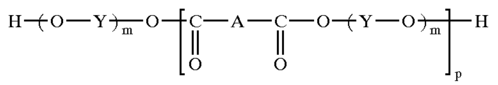

(I-2)

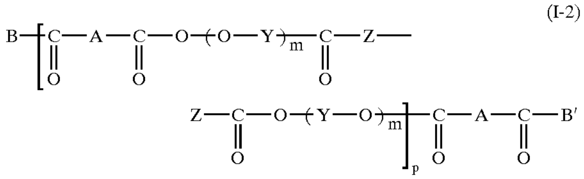

wherein each of Y and Z independently represents a bivalent hydrocarbon group; A represents a group represented by the following general formula (II-1), each of B and B' independently represents the group —O—(Y—O)$_m$—H or the group —O—(Y—O)$_m$—CO-Z-CO—OR' wherein R' represents a hydrogen atom, an alkyl group, a substituted or unsubstituted aryl group, or a substituted or unsubstituted aralkyl group, and each of Y and Z independently represents a bivalent hydrocarbon group, and m is an integer of 1 to 5, m is an integer of 1 to 5, and p is an integer of 5 to 5,000:

(II-1)

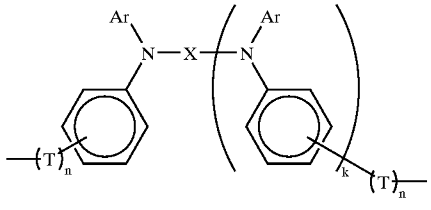

wherein Ar represents a substituted or unsubstituted monovalent polynuclear aromatic ring having 3 to 10 aromatic rings or a substituted or unsubstituted monovalent condensed aromatic ring having 2 to 10 aromatic rings, X represents a substituted or unsubstituted bivalent aromatic group, T represents a bivalent linear hydrocarbon group having 1 to 6 carbon atoms or a bivalent branched hydrocarbon group having 2 to 10 carbon atoms, and each of k and n is an integer of 0 or 1.

2. A charge-transporting polymer according to claim 1, wherein X in the general formula (II-1) represents a group represented by the following structural formula (IV-1) or (IV-2):

(IV-1)

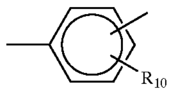

-continued (IV-2)

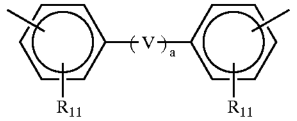

wherein each of $R_{10}$ and $R_{11}$ independently represents a hydrogen atom, an alkyl group having 1 to 4 carbon atoms, an alkoxy group having 1 to 4 carbon atoms, a substituted or unsubstituted phenyl group, a substituted or unsubstituted aralkyl group, or a halogen atom, a is 0 or 1, and V represents a group selected from the following groups (V-1) to (V-10):

$—(CH_2)_b—$ (V-1)

$—C(CH_3)_2—$ (V-2)

—O— (V-3)

—S— (V-4)

(V-5)

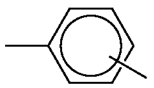

(V-6)

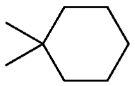

$—C(CF_3)_2—$ (V-7)

$—Si(CH_3)_2—$ (V-8)

—CH═CH— (V-9)

(V-10)

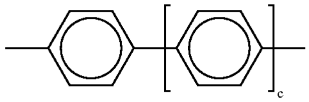

wherein b is an integer of 1 to 10 and c is an integer of 1 to 3.

3. A charge-transporting polymer according to claim 2, wherein X in the general formula (II-1) represents a group represented by the following structural formula (III-1), (III-2) or (III-3):

(III-1)

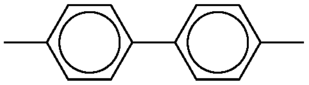

(III-2)

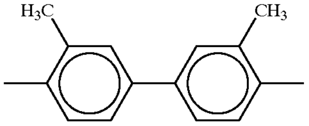

(III-3)

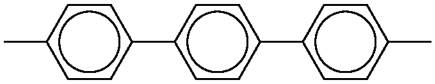

4. A charge-transporting polymer according to claim 1, wherein each of Y and Z in the general formula (I-1) or (I-2) independently represents a group selected from the following structural formulae (VI-1) to (VI-7):

(VI-1)

$—(CH_2)_d—$ (VI-2)

$—(CH_2CH_2O)_e—(CH_2CH_2)—$ (VI-3)

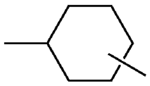

(VI-4)

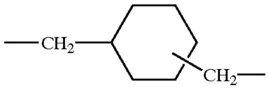

(VI-5)

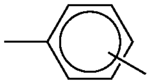

(VI-6)

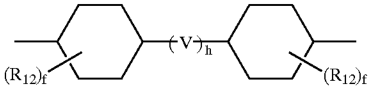

(VI-7)

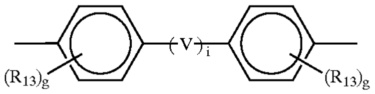

wherein each of $R_{12}$ and $R_{13}$ independently represents a hydrogen atom, an alkyl group having 1 to 4 carbon atoms, an alkoxy group having 1 to 4 carbon atoms, a substituted or unsubstituted phenyl group, a substituted or unsubstituted aralkyl group, or a halogen atom, each of d and e independently represents an integer of 1 to 10, each of f and g independently represents an integer of 0, 1 or 2, and each of h and i independently represents 0 or 1, and V represents a group selected from the following groups (V-1) to (V-10):

(V-1)

$—(CH_2)_b—$ (V-2)

$—C(CH_3)_2—$ (V-3)

—O—

(V-4)

—S—

(V-5)

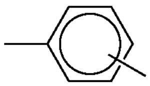

(V-6)

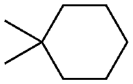

(V-7)

$—C(CF_3)_2—$ (V-8)

$—Si(CH_3)_2—$ (V-9)

—CH═CH—

(V-10)

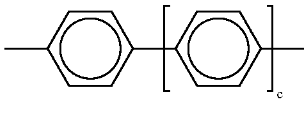

wherein b is an integer of 1 to 10 and c is an integer of 1 to 3.

5. A charge-transporting polymer according to claim 2, wherein each of Y and Z in the general formula (I-1) or (I-2) independently represents a group selected from the following structural formulae (VI-1) to (VI-7):

(VI-1)

$—(CH_2)_d—$ (VI-2)

$—(CH_2CH_2O)_e—(CH_2CH_2)—$ (VI-3)

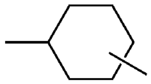

(VI-4)

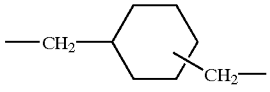

(VI-5)

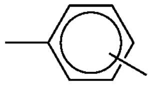

(VI-6)

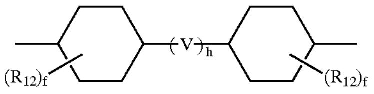

(VI-7)

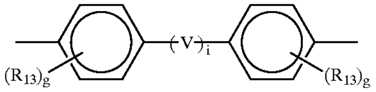

wherein each of $R_{12}$ and $R_{13}$ independently represents a hydrogen atom, an alkyl group having 1 to 4 carbon atoms, an alkoxy group having 1 to 4 carbon atoms, a substituted or unsubstituted phenyl group, a substituted or unsubstituted aralkyl group, or a halogen atom, each of d and e independently represents an integer of 1 to 10, each of f and g independently represents an integer of 0, 1 or 2, and each of h and i independently represents 0 or 1, and V represents a group selected from the following groups (V-1) to (V-10):

(V-1)

$—(CH_2)_b—$ (V-2)

$—C(CH_3)_2—$ (V-3)

—O—

(V-4)

—S—

(V-5)

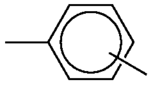

(V-6)

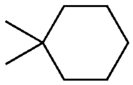

(V-7)

$—C(CF_3)_2—$ (V-8)

$—Si(CH_3)_2—$ (V-9)

—CH═CH—

-continued (V-10)

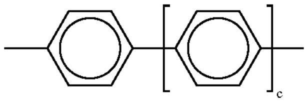

wherein b is an integer of 1 to 10 and c is an integer of 1 to 3.

6. A charge-transporting polymer according to claim 1, wherein Ar in the general formula (II-1) is selected from the group consisting of a substituted or unsubstituted biphenyl group, a substituted or unsubstituted terphenyl group, a substituted or unsubstituted naphthyl group, a substituted or unsubstituted fluorenyl group, a substituted or unsubstituted phenanthrenyl group, and a substituted or unsubstituted pyrenyl group.

7. A charge-transporting polymer according to claim 5, wherein Ar in the general formula (II-1) is selected from the group consisting of a substituted or unsubstituted biphenyl group, a substituted or unsubstituted terphenyl group, a substituted or unsubstituted naphthyl group, a substituted or unsubstituted fluorenyl group, a substituted or unsubstituted phenanthrenyl group, and a substituted or unsubstituted pyrenyl group.

8. A charge-transporting polymer according to claim 6, wherein Ar has a substituent selected from the group consisting of a hydrogen atom, an alkyl group, an alkoxy group, an aryl group, an aralkyl group, a substituted amino group, and a halogen atom.

9. A charge-transporting polymer according to claim 7, wherein Ar has a substituent selected from the group consisting of a hydrogen atom, an alkyl group, an alkoxy group, an aryl group, an aralkyl group, a substituted amino group, and a halogen atom.

10. A charge-transporting polymer according to claim 1, wherein T in the general formula (II-1) is selected from a bivalent linear hydrocarbon group having 2 to 6 carbon atoms and a bivalent branched hydrocarbon group having 3 to 7 carbon atoms.

11. A charge-transporting polymer according to claim 7, wherein T in the general formula (II-1) is selected from a bivalent linear hydrocarbon group having 2 to 6 carbon atoms and a bivalent branched hydrocarbon group having 3 to 7 carbon atoms.

12. A charge-transporting polymer according to claim 1, wherein p in the general formula (I-1) or (I-2) is from 10 to 1,000.

13. A charge-transporting polymer according to claim 11, wherein p in the general formula (I-1) or (I-2) is from 10 to 1,000.

14. A charge-transporting polymer according to claim 1, wherein the polymer has a weight average molecular weight of 10,000 to 300,000.

15. A charge-transporting polymer according to claim 13, wherein the polymer has a weight average molecular weight of 10,000 to 300,000.

* * * * *